(12) United States Patent
Donovan

(10) Patent No.: US 12,055,629 B2
(45) Date of Patent: Aug. 6, 2024

(54) ADAPTIVE MULTIPLE-PULSE LIDAR SYSTEM

(71) Applicant: OPSYS Tech Ltd., Holon (IL)

(72) Inventor: Mark J. Donovan, Mountain View, CA (US)

(73) Assignee: OPSYS Tech Ltd., Holon (IL)

( * ) Notice: Subject to any disclaimer, the term of this patent is extended or adjusted under 35 U.S.C. 154(b) by 279 days.

(21) Appl. No.: 16/907,732

(22) Filed: Jun. 22, 2020

(65) Prior Publication Data

US 2020/0408908 A1    Dec. 31, 2020

Related U.S. Application Data

(60) Provisional application No. 62/866,119, filed on Jun. 25, 2019.

(51) Int. Cl.
*G01S 17/10* (2020.01)
*G01J 1/00* (2006.01)
(Continued)

(52) U.S. Cl.
CPC .............. *G01S 17/10* (2013.01); *G01J 1/00* (2013.01); *G01S 7/4808* (2013.01);
(Continued)

(58) Field of Classification Search
CPC ...... G01S 17/10; G01S 17/931; G01S 7/4808; G01S 7/4814; G01S 7/4817;
(Continued)

(56) References Cited

U.S. PATENT DOCUMENTS 5,157,257 A    10/1992    Geiger
5,552,893 A    9/1996    Akasu
(Continued)

FOREIGN PATENT DOCUMENTS

CN    1512946 A    7/2004
CN    101013030 A    8/2007
(Continued)

OTHER PUBLICATIONS

"Notification of Transmittal of the International Search Report and the Written Opinion of the International Searching Authority, or the Declaration" for International Application No. PCT/US2020/038927, 14 pages, ISA/KR, International Searching Authority, Daejeong, Republic of Korean.
(Continued)

*Primary Examiner* — Daniel L Murphy
(74) *Attorney, Agent, or Firm* — Rauschenbach Patent Law Group, PLLC; Kurt Rauschenbach

(57) ABSTRACT

A method of Light Detection and Ranging (LIDAR) includes generating a first optical pulse that propagates towards a target and receiving an optical return signal reflected from the target resulting from the generated first optical pulse. The optical return signal is processed to determine a number of additional optical pulses desired to be propagated towards the target to meet a performance criteria. The determined number of additional optical pulses is then generated and propagated towards the target. The additional optical return signals reflected from the target are received and processed to obtain one or more LIDAR measurements.

19 Claims, 10 Drawing Sheets

(51) Int. Cl.
  *G01S 7/48* (2006.01)
  *G01S 7/481* (2006.01)
  *G01S 7/487* (2006.01)
  *G01S 17/89* (2020.01)
  *G01S 17/931* (2020.01)
  *G01W 1/02* (2006.01)

(52) U.S. Cl.
  CPC .......... *G01S 7/4814* (2013.01); *G01S 7/4817* (2013.01); *G01S 7/4876* (2013.01); *G01S 17/89* (2013.01); *G01S 17/931* (2020.01); *G01W 1/02* (2013.01)

(58) Field of Classification Search
  CPC ...... G01S 7/4876; G01S 17/89; G01S 7/4815; G01S 7/4816; G01S 7/484; G01S 7/497; G01S 17/42; G01S 17/48; G01S 7/4865; G01J 1/00; G01W 1/02
  USPC .......................................................... 702/3
  See application file for complete search history.

(56) References Cited

U.S. PATENT DOCUMENTS

| | | | |
|---|---|---|---|
| 5,909,296 | A | 6/1999 | Tsacoyeanes |
| 6,057,909 | A | 5/2000 | Yahav et al. |
| 6,061,001 | A | 5/2000 | Sugimoto |
| 6,246,708 | B1 | 6/2001 | Thornton et al. |
| 6,353,502 | B1 | 3/2002 | Marchant et al. |
| 6,680,788 | B1 | 1/2004 | Roberson et al. |
| 6,717,972 | B2 | 4/2004 | Steinle et al. |
| 6,775,480 | B1 | 8/2004 | Goodwill |
| 6,788,715 | B1 | 9/2004 | Leeuwen et al. |
| 6,829,439 | B1 | 12/2004 | Sidorovich et al. |
| 6,860,350 | B2 | 3/2005 | Beuhler et al. |
| 6,888,871 | B1 | 5/2005 | Zhang et al. |
| 7,065,112 | B2 | 6/2006 | Ghosh et al. |
| 7,110,183 | B2 | 9/2006 | von Freyhold et al. |
| 7,544,945 | B2 | 6/2009 | Tan et al. |
| 7,652,752 | B2 | 1/2010 | Fetzer et al. |
| 7,702,191 | B1 | 4/2010 | Geron et al. |
| 7,746,450 | B2 | 6/2010 | Willner et al. |
| 7,773,204 | B1 | 8/2010 | Nelson |
| 7,969,558 | B2 | 6/2011 | Hall |
| 8,072,581 | B1 | 12/2011 | Breiholz |
| 8,115,909 | B2 | 2/2012 | Behringer et al. |
| 8,247,252 | B2 | 8/2012 | Gauggel et al. |
| 8,301,027 | B2 | 10/2012 | Shaw et al. |
| 8,576,885 | B2 | 11/2013 | van Leeuwen et al. |
| 8,675,181 | B2 | 3/2014 | Hall |
| 8,675,706 | B2 | 3/2014 | Seurin et al. |
| 8,783,893 | B1 | 7/2014 | Seurin et al. |
| 8,824,519 | B1 | 9/2014 | Seurin et al. |
| 9,038,883 | B2 | 5/2015 | Wang et al. |
| 9,048,633 | B2 | 6/2015 | Gronenbom et al. |
| 9,268,012 | B2 | 2/2016 | Ghosh et al. |
| 9,285,477 | B1 | 3/2016 | Smith et al. |
| 9,348,018 | B2 | 5/2016 | Eisele et al. |
| 9,360,554 | B2 | 6/2016 | Retterath et al. |
| 9,378,640 | B2 | 6/2016 | Mimeault et al. |
| 9,392,259 | B2 | 7/2016 | Borowski |
| 9,516,244 | B2 | 12/2016 | Borowski |
| 9,520,696 | B2 | 12/2016 | Wang et al. |
| 9,553,423 | B2 | 1/2017 | Chen et al. |
| 9,560,339 | B2 | 1/2017 | Borowski |
| 9,574,541 | B2 | 2/2017 | Ghosh et al. |
| 9,575,184 | B2 | 2/2017 | Gilliland et al. |
| 9,658,322 | B2 | 5/2017 | Lewis |
| 9,674,415 | B2 | 6/2017 | Wan et al. |
| 9,791,557 | B1 | 10/2017 | Wyrwas et al. |
| 9,841,495 | B2 | 12/2017 | Campbell et al. |
| 9,857,468 | B1 | 1/2018 | Eichenholz et al. |
| 9,933,513 | B2 | 4/2018 | Dussan et al. |
| 9,946,089 | B2 | 4/2018 | Chen et al. |
| 9,989,406 | B2 | 6/2018 | Pacala et al. |
| 9,989,629 | B1 | 6/2018 | LaChapelle |
| 9,992,477 | B2 | 6/2018 | Pacala et al. |
| 10,007,001 | B1 | 6/2018 | LaChapelle et al. |
| 10,063,849 | B2 | 8/2018 | Pacala et al. |
| 10,191,156 | B2 | 1/2019 | Steinberg et al. |
| 10,295,660 | B1 | 5/2019 | McMichael et al. |
| 10,488,492 | B2 | 11/2019 | Hamel et al. |
| 10,514,444 | B2 | 12/2019 | Donovan |
| 10,761,195 | B2 | 9/2020 | Donovan |
| 10,928,486 | B2 | 2/2021 | Donovan |
| 11,016,178 | B2 | 5/2021 | Donovan |
| 11,061,234 | B1 | 7/2021 | Zhu et al. |
| 11,320,538 | B2 | 5/2022 | Donovan et al. |
| 2002/0117340 | A1 | 8/2002 | Stettner |
| 2002/0195496 | A1 | 12/2002 | Tsikos et al. |
| 2003/0043363 | A1 | 3/2003 | Jamieson et al. |
| 2003/0147652 | A1 | 8/2003 | Green et al. |
| 2004/0120717 | A1 | 6/2004 | Clark et al. |
| 2004/0228375 | A1 | 11/2004 | Ghosh et al. |
| 2005/0025211 | A1 | 2/2005 | Zhang et al. |
| 2005/0180473 | A1 | 8/2005 | Brosnan |
| 2005/0232628 | A1 | 10/2005 | von Freyhold et al. |
| 2006/0132752 | A1 | 6/2006 | Kane |
| 2006/0231771 | A1 | 10/2006 | Lee et al. |
| 2006/0244978 | A1 | 11/2006 | Yamada et al. |
| 2007/0024849 | A1 | 2/2007 | Carrig et al. |
| 2007/0071056 | A1 | 3/2007 | Chen |
| 2007/0091960 | A1 | 4/2007 | Gauggel et al. |
| 2007/0131842 | A1 | 6/2007 | Ernst |
| 2007/0177841 | A1 | 8/2007 | Dazinger |
| 2007/0181810 | A1 | 8/2007 | Tan et al. |
| 2007/0219720 | A1 | 9/2007 | Trepagnier et al. |
| 2008/0074640 | A1 | 3/2008 | Walsh et al. |
| 2008/0186470 | A1 | 8/2008 | Hipp |
| 2009/0027651 | A1 | 1/2009 | Pack et al. |
| 2009/0140047 | A1 | 6/2009 | Yu et al. |
| 2009/0161710 | A1 | 6/2009 | Hoashi et al. |
| 2009/0273770 | A1 | 11/2009 | Bauhahn et al. |
| 2009/0295986 | A1 | 12/2009 | Topliss et al. |
| 2010/0046953 | A1 | 2/2010 | Shaw et al. |
| 2010/0215066 | A1 | 8/2010 | Mordaunt et al. |
| 2010/0271614 | A1 | 10/2010 | Alburquerque et al. |
| 2010/0302528 | A1 | 12/2010 | Hall |
| 2011/0176567 | A1 | 7/2011 | Joseph |
| 2011/0216304 | A1 | 9/2011 | Hall |
| 2012/0038903 | A1 | 2/2012 | Weimer et al. |
| 2013/0163626 | A1 | 6/2013 | Seurin et al. |
| 2013/0163627 | A1 | 6/2013 | Seurin et al. |
| 2013/0206967 | A1 | 8/2013 | Shpunt et al. |
| 2013/0208256 | A1 | 8/2013 | Mamidipudi et al. |
| 2013/0208753 | A1 | 8/2013 | van Leeuwen et al. |
| 2014/0043309 | A1 | 2/2014 | Go et al. |
| 2014/0049610 | A1 | 2/2014 | Hudman et al. |
| 2014/0071427 | A1 | 3/2014 | Last |
| 2014/0111812 | A1 | 4/2014 | Baeg et al. |
| 2014/0139467 | A1 | 5/2014 | Ghosh et al. |
| 2014/0160341 | A1 | 6/2014 | Tickoo et al. |
| 2014/0218898 | A1 | 8/2014 | Seurin et al. |
| 2014/0247841 | A1 | 9/2014 | Seurin et al. |
| 2014/0267701 | A1 | 9/2014 | Aviv et al. |
| 2014/0303829 | A1* | 10/2014 | Lombrozo ............... G01S 13/88 701/23 |
| 2014/0312233 | A1 | 10/2014 | Mark et al. |
| 2014/0333995 | A1 | 11/2014 | Seurin et al. |
| 2014/0350836 | A1 | 11/2014 | Stettner et al. |
| 2014/0376092 | A1 | 12/2014 | Mor |
| 2015/0055117 | A1 | 2/2015 | Pennecot et al. |
| 2015/0069113 | A1 | 3/2015 | Wang et al. |
| 2015/0097947 | A1 | 4/2015 | Hudman et al. |
| 2015/0103358 | A1 | 4/2015 | Flascher |
| 2015/0109603 | A1 | 4/2015 | Kim et al. |
| 2015/0123995 | A1 | 5/2015 | Zavodny et al. |
| 2015/0131080 | A1 | 5/2015 | Retterath et al. |
| 2015/0160341 | A1 | 6/2015 | Akatsu et al. |
| 2015/0219764 | A1 | 8/2015 | Lipson |
| 2015/0255955 | A1 | 9/2015 | Wang et al. |
| 2015/0260830 | A1 | 9/2015 | Ghosh et al. |
| 2015/0260843 | A1 | 9/2015 | Lewis |
| 2015/0311673 | A1 | 10/2015 | Wang et al. |

(56) References Cited

U.S. PATENT DOCUMENTS

| | | |
|---|---|---|
| 2015/0316368 A1 | 11/2015 | Moench et al. |
| 2015/0340841 A1 | 11/2015 | Joseph |
| 2015/0362585 A1 | 12/2015 | Ghosh et al. |
| 2015/0377696 A1 | 12/2015 | Shpunt et al. |
| 2015/0378023 A1 | 12/2015 | Royo Royo et al. |
| 2016/0003946 A1 | 1/2016 | Gilliland et al. |
| 2016/0006914 A1 | 1/2016 | Neumann |
| 2016/0025842 A1 | 1/2016 | Anderson et al. |
| 2016/0025993 A1 | 1/2016 | Mor et al. |
| 2016/0033642 A1 | 2/2016 | Fluckiger |
| 2016/0072258 A1 | 3/2016 | Seurin et al. |
| 2016/0080077 A1 | 3/2016 | Joseph et al. |
| 2016/0119611 A1 | 4/2016 | Hall et al. |
| 2016/0161600 A1 | 6/2016 | Eldada et al. |
| 2016/0254638 A1 | 9/2016 | Chen et al. |
| 2016/0259038 A1 | 9/2016 | Retterath et al. |
| 2016/0266242 A1 | 9/2016 | Gilliland et al. |
| 2016/0274223 A1 | 9/2016 | Imai |
| 2016/0282468 A1 | 9/2016 | Gruver et al. |
| 2016/0291156 A1 | 10/2016 | Hjelmstad |
| 2016/0306358 A1 | 10/2016 | Kang et al. |
| 2016/0335778 A1 | 11/2016 | Smits |
| 2016/0348636 A1 | 12/2016 | Ghosh et al. |
| 2017/0003392 A1 | 1/2017 | Bartlett et al. |
| 2017/0026633 A1 | 1/2017 | Riza |
| 2017/0059838 A1 | 3/2017 | Tilleman |
| 2017/0115497 A1 | 4/2017 | Chen et al. |
| 2017/0131387 A1 | 5/2017 | Campbell et al. |
| 2017/0131388 A1 | 5/2017 | Campbell et al. |
| 2017/0139041 A1 | 5/2017 | Drader et al. |
| 2017/0153319 A1 | 6/2017 | Villeneuve et al. |
| 2017/0168162 A1 | 6/2017 | Jungwirth |
| 2017/0176579 A1 | 6/2017 | Niclass et al. |
| 2017/0181810 A1 | 6/2017 | Tennican |
| 2017/0219426 A1 | 8/2017 | Pacala et al. |
| 2017/0256915 A1 | 9/2017 | Ghosh et al. |
| 2017/0269209 A1 | 9/2017 | Hall et al. |
| 2017/0285169 A1 | 10/2017 | Holz |
| 2017/0289524 A1 | 10/2017 | Pacala et al. |
| 2017/0299722 A1 | 10/2017 | Gong et al. |
| 2017/0307736 A1 | 10/2017 | Donovan |
| 2017/0307758 A1 | 10/2017 | Pei et al. |
| 2017/0350982 A1 | 12/2017 | Lipson |
| 2017/0353004 A1 | 12/2017 | Chen et al. |
| 2017/0356740 A1 | 12/2017 | Ansari et al. |
| 2018/0045816 A1 | 2/2018 | Jarosinski et al. |
| 2018/0058923 A1 | 3/2018 | Lipson et al. |
| 2018/0059222 A1 | 3/2018 | Pacala et al. |
| 2018/0062345 A1 | 3/2018 | Bills et al. |
| 2018/0068458 A1 | 3/2018 | Wan et al. |
| 2018/0074198 A1 | 3/2018 | Von Novak et al. |
| 2018/0107221 A1 | 4/2018 | Droz et al. |
| 2018/0113200 A1 | 4/2018 | Steinberg et al. |
| 2018/0113208 A1 | 4/2018 | Bergeron et al. |
| 2018/0120441 A1 * | 5/2018 | Elooz .................. G01S 7/4863 |
| 2018/0128920 A1 | 5/2018 | Keilaf et al. |
| 2018/0136335 A1 | 5/2018 | Kare et al. |
| 2018/0152691 A1 | 5/2018 | Pacala et al. |
| 2018/0167602 A1 | 6/2018 | Pacala et al. |
| 2018/0180720 A1 | 6/2018 | Pei et al. |
| 2018/0180721 A1 | 6/2018 | Pei et al. |
| 2018/0180722 A1 | 6/2018 | Pei et al. |
| 2018/0203247 A1 | 7/2018 | Chen et al. |
| 2018/0209841 A1 | 7/2018 | Pacala et al. |
| 2018/0217236 A1 | 8/2018 | Pacala et al. |
| 2018/0259623 A1 | 9/2018 | Donovan |
| 2018/0259624 A1 | 9/2018 | Kiehn et al. |
| 2018/0259645 A1 | 9/2018 | Shu et al. |
| 2018/0269646 A1 | 9/2018 | Welford et al. |
| 2018/0275248 A1 | 9/2018 | Bailey et al. |
| 2018/0299552 A1 | 10/2018 | Shu et al. |
| 2018/0301872 A1 | 10/2018 | Burroughs et al. |
| 2018/0301874 A1 | 10/2018 | Burroughs et al. |
| 2018/0301875 A1 | 10/2018 | Burroughs et al. |
| 2018/0364334 A1 | 12/2018 | Xiang et al. |
| 2018/0364356 A1 | 12/2018 | Eichenholz et al. |
| 2019/0003429 A1 | 1/2019 | Miyashita |
| 2019/0004156 A1 | 1/2019 | Niclass et al. |
| 2019/0011561 A1 | 1/2019 | Pacala et al. |
| 2019/0011567 A1 | 1/2019 | Pacala et al. |
| 2019/0018115 A1 | 1/2019 | Schmitt et al. |
| 2019/0036308 A1 | 1/2019 | Carson et al. |
| 2019/0049662 A1 | 2/2019 | Thomsen et al. |
| 2019/0056497 A1 * | 2/2019 | Pacala .................. G01S 7/4863 |
| 2019/0094346 A1 | 3/2019 | Dumoulin et al. |
| 2019/0098233 A1 | 3/2019 | Gassend et al. |
| 2019/0137607 A1 | 5/2019 | Kostamovaara |
| 2019/0146071 A1 | 5/2019 | Donovan |
| 2019/0170855 A1 | 6/2019 | Keller et al. |
| 2019/0178974 A1 | 6/2019 | Droz |
| 2019/0179018 A1 | 6/2019 | Gunnam et al. |
| 2019/0293954 A1 | 9/2019 | Lin et al. |
| 2019/0302246 A1 | 10/2019 | Donovan et al. |
| 2020/0018835 A1 | 1/2020 | Pei et al. |
| 2020/0041614 A1 | 2/2020 | Donovan et al. |
| 2020/0081101 A1 | 3/2020 | Donovan |
| 2020/0124732 A1 | 4/2020 | Sutherland et al. |
| 2020/0200874 A1 | 6/2020 | Donovan |
| 2020/0209355 A1 | 7/2020 | Pacala et al. |
| 2020/0278426 A1 | 9/2020 | Dummer et al. |
| 2020/0326425 A1 | 10/2020 | Donovan et al. |
| 2020/0379088 A1 | 12/2020 | Donovan et al. |
| 2020/0386868 A1 | 12/2020 | Donovan et al. |
| 2021/0033708 A1 | 2/2021 | Fabiny |
| 2021/0041567 A1 | 2/2021 | Milgrome et al. |
| 2021/0157000 A1 | 5/2021 | Imaki |
| 2021/0181311 A1 | 6/2021 | Donovan |
| 2021/0231779 A1 | 7/2021 | Donovan |
| 2021/0231806 A1 | 7/2021 | Donovan et al. |
| 2021/0234342 A1 | 7/2021 | Donovan |
| 2021/0278540 A1 | 9/2021 | Maayan et al. |
| 2021/0321080 A1 | 10/2021 | Jeong et al. |
| 2022/0146680 A1 | 5/2022 | Donovan et al. |

FOREIGN PATENT DOCUMENTS

| | | | |
|---|---|---|---|
| CN | 101080733 A | 11/2007 | |
| CN | 101545582 A | 9/2009 | |
| CN | 103633557 A | 3/2014 | |
| CN | 104898125 A | 9/2015 | |
| CN | 105705964 A | 6/2016 | |
| CN | 106464366 A | 2/2017 | |
| CN | 109073757 A | 12/2018 | |
| CN | 107728156 B * | 11/2019 | ............. G01S 17/02 |
| CN | 110402398 A | 11/2019 | |
| CN | 110914702 A | 3/2020 | |
| CN | 111356934 A | 6/2020 | |
| CN | 111919137 A | 11/2020 | |
| CN | 112543875 A | 3/2021 | |
| CN | 113692540 A | 11/2021 | |
| CN | 113906316 A | 1/2022 | |
| CN | 113924506 A | 1/2022 | |
| CN | 114096882 A | 2/2022 | |
| CN | 114174869 A | 3/2022 | |
| DE | 197 17 399 A1 | 6/1999 | |
| DE | 10103861 A1 * | 8/2001 | ............. G01S 17/10 |
| DE | 102007004609 A1 | 8/2007 | |
| EP | 1160540 A1 | 12/2001 | |
| EP | 1444696 B1 | 3/2005 | |
| EP | 1569007 A2 | 8/2005 | |
| EP | 2656099 A1 | 12/2011 | |
| EP | 2656106 A1 | 12/2011 | |
| EP | 2775316 A2 | 9/2014 | |
| EP | 3497477 A1 | 8/2016 | |
| EP | 2656100 A1 | 10/2016 | |
| EP | 3526625 A1 | 11/2016 | |
| EP | 3 159 711 A1 | 4/2017 | |
| EP | 3446153 A2 | 2/2019 | |
| EP | 3596492 A1 | 1/2020 | |
| EP | 3658949 A1 | 6/2020 | |
| EP | 3710855 A2 | 9/2020 | |
| EP | 3775979 A1 | 2/2021 | |
| EP | 3830602 A1 | 6/2021 | |
| EP | 3953727 A1 | 2/2022 | |

(56) References Cited

FOREIGN PATENT DOCUMENTS

| | | |
|---|---|---|
| EP | 3977159 A1 | 4/2022 |
| EP | 3980808 A1 | 4/2022 |
| EP | 3990943 A1 | 5/2022 |
| EP | 4004587 A1 | 6/2022 |
| FR | 2816264 A1 | 5/2002 |
| JP | 5-243552 A | 9/1993 |
| JP | H7-253460 A | 10/1995 |
| JP | 8-280173 A | 10/1996 |
| JP | 10-126007 A | 5/1998 |
| JP | 2000-147604 A | 5/2000 |
| JP | 2000-275340 A | 10/2000 |
| JP | 2002-214361 A | 7/2002 |
| JP | 2003-258359 A | 9/2003 |
| JP | 2003-536061 A | 12/2003 |
| JP | 2004-078255 A | 3/2004 |
| JP | 2004-094115 A | 3/2004 |
| JP | 2004-361315 A | 12/2004 |
| JP | 2005-331273 A | 12/2005 |
| JP | 2006-162386 A | 6/2006 |
| JP | 2006-322834 A | 11/2006 |
| JP | 2007-214564 A | 8/2007 |
| JP | 2007-327840 A | 12/2007 |
| JP | 2008-015434 A | 1/2008 |
| JP | 4108478 B2 | 6/2008 |
| JP | 2008-180719 A | 8/2008 |
| JP | 2009-103529 A | 5/2009 |
| JP | 2009-170870 A | 7/2009 |
| JP | 2009-204691 A | 9/2009 |
| JP | 2010-091855 A | 4/2010 |
| JP | 2010-164463 A | 7/2010 |
| JP | 2010-256291 A | 11/2010 |
| JP | 2011-003748 A | 1/2011 |
| JP | 2012-504771 A | 2/2012 |
| JP | 5096008 B2 | 12/2012 |
| JP | 2013-050310 A | 3/2013 |
| JP | 2013-096742 A | 5/2013 |
| JP | 2013-113669 A | 6/2013 |
| JP | 2014-059302 A | 4/2014 |
| JP | 2014-077658 A | 5/2014 |
| JP | 2016-146417 | 8/2016 |
| JP | 2016-176721 A | 10/2016 |
| JP | 2016-188808 A | 11/2016 |
| JP | 2016-540189 A | 12/2016 |
| JP | 2017-053833 A | 3/2017 |
| JP | 2017-134814 A | 8/2017 |
| JP | 2018-025632 A | 2/2018 |
| JP | 2019-060652 A | 4/2019 |
| JP | 2019-68528 A | 4/2019 |
| JP | 2019-509474 A | 4/2019 |
| JP | 2019-516101 A | 6/2019 |
| JP | 2020-510208 A | 4/2020 |
| JP | 2021-503085 A | 2/2021 |
| JP | 2021-507260 A | 2/2021 |
| JP | 6839861 B2 | 3/2021 |
| JP | 6865492 B2 | 4/2021 |
| JP | 2021-073462 A1 | 5/2021 |
| JP | 2021-73473 A1 | 5/2021 |
| JP | 2021-105613 A | 7/2021 |
| JP | 2021-519926 A | 8/2021 |
| JP | 2021-139918 A | 9/2021 |
| JP | 2021-532368 A | 11/2021 |
| JP | 2022-1885 A | 1/2022 |
| JP | 6995413 B2 | 1/2022 |
| JP | 2022-022361 A | 2/2022 |
| JP | 2022-36224 A | 3/2022 |
| JP | 7037830 B2 | 3/2022 |
| JP | 2022-526998 A | 5/2022 |
| JP | 2022-534500 A | 8/2022 |
| KR | 10-2000-0053620 A | 8/2000 |
| KR | 10-2009-0016499 A | 2/2009 |
| KR | 10-2012-0053045 A | 5/2012 |
| KR | 10-2012-0061033 A | 6/2012 |
| KR | 10-2013-0140554 A | 12/2013 |
| KR | 10-2014-0138724 A | 12/2014 |
| KR | 10-2015-0045735 A | 4/2015 |
| KR | 10-2016-0101140 A | 8/2016 |
| KR | 10-2018-0049937 A | 5/2018 |
| KR | 10-2018-0064969 A | 6/2018 |
| KR | 10-2018-0128447 A | 12/2018 |
| KR | 10-2019-0076725 A | 7/2019 |
| KR | 10-2019-0117418 A | 10/2019 |
| KR | 10-2019-0120403 A | 10/2019 |
| KR | 10-2020-0011351 A | 2/2020 |
| KR | 10-2020-0075014 A | 6/2020 |
| KR | 10-2020-0096632 A | 8/2020 |
| KR | 10-2020-0128435 A | 11/2020 |
| KR | 10-2021-0021409 A | 2/2021 |
| KR | 10-2021-0021409 B1 | 2/2021 |
| KR | 10-2218679 A | 2/2021 |
| KR | 10-2021-0029831 A | 3/2021 |
| KR | 10-2021-0065207 A | 6/2021 |
| KR | 10-2021-0137584 B1 | 11/2021 |
| KR | 10-2021-0137586 A | 11/2021 |
| KR | 10-2326493 B1 | 11/2021 |
| KR | 10-2326508 B1 | 11/2021 |
| KR | 10-2022-0003600 A | 1/2022 |
| KR | 10-2022-0017412 A | 2/2022 |
| KR | 10-2364531 B1 | 2/2022 |
| KR | 10-2022-0024177 A | 3/2022 |
| KR | 10-2022-0025924 A | 3/2022 |
| KR | 10-2022-0038691 A | 3/2022 |
| KR | 10-2398080 B1 | 5/2022 |
| WO | 99-42856 A1 | 8/1999 |
| WO | 2002/065153 A1 | 8/2002 |
| WO | 2006/044758 A2 | 4/2006 |
| WO | 2006/083349 A2 | 8/2006 |
| WO | 2013107709 A1 | 7/2013 |
| WO | 2014/014838 A2 | 1/2014 |
| WO | 2015040671 | 3/2015 |
| WO | 2015/059705 A1 | 4/2015 |
| WO | 2017/112416 A1 | 6/2017 |
| WO | 2017/132704 A1 | 8/2017 |
| WO | 2017/184336 A2 | 10/2017 |
| WO | 2018028795 A1 | 2/2018 |
| WO | 2018082762 A1 | 5/2018 |
| WO | 2018/169758 A1 | 9/2018 |
| WO | 2018166609 A1 | 9/2018 |
| WO | 2018166610 A1 | 9/2018 |
| WO | 2018166611 A1 | 9/2018 |
| WO | 2018169758 | 9/2018 |
| WO | 2018/180391 A | 10/2018 |
| WO | 2018/181250 A1 | 10/2018 |
| WO | 2018/191495 A1 | 10/2018 |
| WO | 2019/010320 A1 | 1/2019 |
| WO | 2019/022941 A1 | 1/2019 |
| WO | 2019-064062 A1 | 4/2019 |
| WO | 2019/195054 A1 | 10/2019 |
| WO | 2019/221776 A2 | 11/2019 |
| WO | 2020/028173 A1 | 2/2020 |
| WO | 2020/210176 A1 | 10/2020 |
| WO | 2020/242834 A1 | 12/2020 |
| WO | 2020/251891 A1 | 12/2020 |
| WO | 2020/263735 A1 | 12/2020 |
| WO | 2021/021872 A1 | 2/2021 |
| WO | 2021/150860 A1 | 7/2021 |
| WO | 2021/236201 A2 | 11/2021 |
| WO | 2022/103778 A1 | 5/2022 |

OTHER PUBLICATIONS

International Preliminary Report on Patentability received for PCT Application Serial No. PCT/US2020/038927 dated Jan. 6, 2022, 9 pages.

Plant, et al., 256-Channel Bidirectional Optical Interconnect Using VCSELs and Photodiodes on CMOS, IEEE Journal of Lightwave Technology, Aug. 2001, pp. 1093-1103, vol. 19, No. 8.

Knodl, et al., Bipolar Cascade VCSEL with 130% Differential Quantum Efficiency, Annual Report 2000, Optoelectronics Department, University of ULM, pp. 11-14.

R.A. Morgan, et al., Two-Dimensional Matrix Addressed Vertical Cavity Top-Surface Emitting Laser Array Display, IEEE Photonics Technology Letters, Aug. 1994, pp. 913-917, vol. 6, No. 8.

(56) References Cited

OTHER PUBLICATIONS

M. Orenstein, et al., Matrix Addressable Vertical Cavity Surface Emitting Laser Array, Electronics Letters, Feb. 28, 1991, pp. 437-438, vol. 27, No. 5.
K.M. Geib, et al., Fabrication and Performance of Two-Dimensional Matrix Addressable Arrays of Integrated Vertical-Cavity Lasers and Resonant Cavity Photodetectors, IEEE Journal of Selected Topics in Quantum Electronics, Jul./Aug. 2002, pp. 943-947, vol. 8, No. 4.
Moench, et al., VCSEL Based Sensors for Distance and Velocity, Vertical Cavity Surface-Emitting Lasers XX, Edited by K. Choquette, J. Guenter, Proc of SPIE, 2016, 11 pages, vol. 9766, 07660A.
"Written Opinion of the International Searching Authority" for International Patent Application No. PCT/EP2016/077499, Feb. 14, 2017, 7 pages, The International Searching Authority.
"Search Report" for International Patent Application No. PCT/EP2016/077499, 2 pages, International Searching Authority/ EPO, Rijswijk, the Netherlands.
Non-Final Office Action received for U.S. Appl. No. 15/456,789, mailed on Sep. 25, 2019, 10 pages.
Notice of Allowance received for U.S. Appl. No. 15/456,789, mailed on Apr. 29, 2020, 5 pages.
Non-Final Office Action received for U.S. Appl. No. 15/915,840, mailed on May 7, 2020, 11 pages.
Notice of Allowance received for U.S. Appl. No. 15/915,840, mailed on Jan. 19, 2021, 6 pages.
Extended European Search Report received for European Patent Application No. 18767885.9, Nov. 18, 2020, 10 pages.
Office Action received for Japanese Patent Application No. 2019-549550, mailed on Mar. 22, 2021, 6 pages (3 pages of English Translation and 3 pages of Official Copy).
Office Action received for Korean Patent Application No. 10-2019-7029980, mailed on Mar. 26, 2021, 6 pages (3 pages of English Translation and 3 pages of Official Copy).
International Preliminary Report on Patentability received for International Patent Application No. PCT/US2018/021553, mailed on Sep. 26, 2019, 9 Pages.
Notice of Allowance received for Japanese Patent Application No. 2018-555665, mailed on Dec. 2, 2020, 05 pages (2 pages of English Translation and 3 pages of Official Copy).
Office Action received for Japanese Patent Application No. 2021-014376, mailed on Sep. 27, 2021, 18 pages (12 pages of English Translation and 6 paegs of Official Copy).
International Preliminary Report on Patentability received for PCT Application Serial No. PCT/US2020/036634, mailed on Dec. 23, 2021, 6 pages.
International Search Report and Written Opinion received for PCT Application Serial No. PCT/US2021/058687, mailed on Mar. 3, 2022 , 11 pages.
Office Action received for Korean Patent Application No. 10-2018-7030512, mailed on Dec. 23, 2021, 7 pages. (3 pages of English Translation and 4 pages of Official Copy).
Notice of Allowance received for Korean Patent Application No. 10-2019-7029980, mailed on Aug. 6, 2021, 3 pages (1 page of English Translation and 2 pages of Official Copy).
Office Action received for Japanese Patent Application No. 2019-549550, mailed on Aug. 27, 2021, 7 pages (5 pages of English Translation and 2 pages of Official Copy).
Notice of Allowance received for U.S. Appl. No. 16/028,774, mailed on Aug. 21, 2019, 10 pages.
Non-Final Office Action received for U.S. Appl. No. 16/686,163, mailed on Apr. 16, 2020, 9 pages.
Notice of Allowance received for U.S. Appl. No. 16/686,163, mailed on Oct. 16, 2020, 9 pages.
Office Action received for Korean Patent Application No. 10-2020-7005082, mailed on May 8, 2020, 19 pages (11 pages of English Translation and 8 pages of Official Copy).
Office Action received for Japanese Patent Application No. 2020-504014, mailed on Sep. 2, 2020, 7 pages (3 pages of English Translation and 4 pages of Official Copy).
Notice of Grant received for Korean Patent Application No. 10-2020-7005082, Nov. 24, 2020, 5 pages (3 pages of English Translation and 2 pages of Official Copy).
Office Action received for Chinese Patent Application No. 201880047615.6, mailed on Jan. 18, 2021, 16 pages (8 pages of English Translation and 8 pages of Official Copy).
Notice of Allowance received for Japanese Patent Application No. 2020-504014, mailed on Feb. 15, 2021, 5 pages (2 pages of English Translation and 3 pages of Official Copy).
Extended European Search Report received for European Patent Application No. 18839499.3, mailed on Mar. 4, 2021, 10 pages.
Office Action received for Korean Patent Application No. 10-2021-7004589, mailed on Mar. 10, 2021, 9 pages (5 pages of English Translation and 4 pages of Official Copy).
Office Action received for Japanese Patent Application No. 2021-056628, mailed on Jun. 14, 2021, 6 pages (3 pages of English Translation and 3 pages of Official Copy).
Notice of Allowance received for Korean Patent Application No. 10-2021-7004589, mailed on Aug. 6, 2021, 2 pages (1 page of English Translation and 1 page of Official Copy).
Office Action received for Chinese Patent Application Serial No. 201880047615.6, mailed on Aug. 25, 2021, 12 pages (6 pages of English Translation and 6 pages of Official Copy).
Notice of Allowance received for Japanese Patent Application Serial No. 2021-056628, mailed on Nov. 2, 2021, 5 pages (2 pages of English Translation and 3 pages of Official Copy).
Non-Final Office Action received for U.S. Appl. No. 16/168,054, mailed on Jun. 1, 2021, 15 pages.
International Preliminary Report on Patentability received for PCT Patent Application No. PCT/US2018/057026, mailed on May 28, 2020, 7 pages.
Extended European Search Report received for European Patent Application No. 18918938.4, mailed on Jul. 6, 2021, 9 pages.
Office Action received for Korean Patent Application No. 10-2020-7016928, mailed on Jul. 16, 2021, 13 pages (7 pages of English Translation and 6 pages of Official Copy).
Partial Supplementary European Search Report received for European Patent Application No. 17786325.5, mailed on Nov. 7, 2019, 17 pages.
Office Action received for Korean Patent Application No. 10-2020-7029872, mailed on Jul. 19, 2021, 23 pages (13 pages of English Translation and 10 pages of Official Copy).
Extended European Search Report received for European Patent Application Serial No. 19781037.7, mailed on Oct. 25, 2021, 9 pages.
Office Action received for Korean Patent Application No. 10-2021-7006391, mailed on May 14, 2021, 17 pages (9 pages of English Translation and 8 pages of Official Copy).
International Preliminary Report on Patentability received for PCT Application Serial No. PCT/US2019/043674, mailed on Feb. 18, 2021, 10 pages.
Office Action received for European Patent Application No. 17786325.5, mailed on Dec. 17, 2021, 5 pages.
International Preliminary Report on Patentability received for PCT Patent Application No. PCT/US2020/026964, mailed on Oct. 21, 2021, 7 pages.
Non-Final Office Action received for U.S. Appl. No. 17/227,300, mailed on Jun. 30, 2021, 8 pages.
International Search Report and Written Opinion received for PCT Patent Application No. PCT/US2018/041021, mailed on Nov. 5, 2018, 13 Pages.
International Search Report and the Written Opinion received for PCT Patent Application No. PCT/US2020/036634, mailed on Sep. 21, 2020, 7 pages.
Extended European Search Report received for European Patent Application No. 17786325.5, mailed on Mar. 11, 2020, 22 pages.
International Search Report and the Written Opinion received for PCT Patent Application No. PCT/US2020/043979, mailed on Nov. 10, 2020, 7 pages.
International Search Report and the Written Opinion received for PCT Patent Application No. PCT/US2021/014564, mailed on May 17, 2021, 8 pages.

(56) References Cited

OTHER PUBLICATIONS

Office Action received for Korean Patent Application Serial No. 10-2021-7036648, mailed on Dec. 17, 2021, 8 pages (4 pages of English Translation and 4 pages of Official Copy).
Decision to Grant a Patent received for Korean Patent Application Serial No. 10-2020-7016928, mailed on Nov. 16, 2021, 3 pages (1 page of English Translation and 2 pages of Official Copy).
Final Office Action received for U.S. Appl. No. 16/168,054, mailed on Jan. 26, 2022, 16 pages.
Office Action received for Korean Patent Application Serial No. 10-2021-7006391, mailed on Oct. 22, 2021, 5 pages. (2 pages of English Translation and 3 pages of Official Copy).
Office Action received for Korean Patent Application No. 10-2022-7036873, mailed on Mar. 29, 2023, 22 pages (12 pages of English Translation and 10 pages of Official Copy).
Extended European Search Report received for European Patent Application No. 20822328.9, mailed on May 4, 2023, 34 pages.
Office Action received for Korean Patent Application No. 10-2023-7007292, mailed on Apr. 17, 2023, 19 pages (10 pages of English Translation and 9 pages of Official Copy).
Decision to Grant a Patent received for Korean Patent Application Serial No. 10-2023-7009114, mailed on May 16, 2023, 3 pages (1 page of English Translation and 2 pages of Official Copy).
Office Action for Japanese Patent Application No. 2021-572877, May 12, 2023, 12 pages (8 pages of English Translation and 4 pages of Official Copy).
Office Action received for Japanese Patent Application No. 2021-559434, mailed on May 26, 2023, 17 pages (11 pages of English Translation and 6 pages of Official Copy).
Extended European Search Report received for European Patent Application No. 20831915.2, Jun. 2, 2023, 9 pages.
International Preliminary Report on Patentability received for PCT Application Serial No. PCT/US2021/058687, mailed on May 25, 2023, 7 pages.
Non-Final Office Action received for U.S. Appl. No. 17/227,295, mailed on Mar. 9, 2023, 10 pages.
Final Office Action received for U.S. Appl. No. 16/523,459, mailed on Apr. 14, 2023, 13 pages.
Notice of Allowance received for U.S. Appl. No. 16/805,733, mailed on Nov. 10, 2022, 5 pages.
Notice of Allowance received for U.S. Appl. No. 16/841,930, mailed on Oct. 3, 2022, 8 pages.
Non-Final Office Action received for U.S. Appl. No. 16/168,054, mailed on Oct. 20, 2022, 16 pages.
Notice of Allowance received for U.S. Appl. No. 17/164,773, mailed on Nov. 2, 2022, 8 pages.
Notice of Allowance received for U.S. Appl. No. 16/805,733, mailed on Jan. 25, 2023, 5 pages.
Office Action received for Chinese Patent Application Serial No. 201780024892.0, mailed on Sep. 2, 2022, 28 pages (11 pages of English Translation and 17 pages of Official Copy).
Extended European Search Report received in European Application No. 20787345.6, mailed on Dec. 5, 2022, 8 pages.
Final Office Action received for U.S. Appl. No. 16/878,140, mailed on Feb. 1, 2023, 26 pages.
Notice of Allowance received for U.S. Appl. No. 17/164,773, mailed on Feb. 1, 2023, 8 pages.
Notice of Allowance received for U.S. Appl. No. 16/841,930, mailed on Jan. 30, 2023, 9 pages.
International Search Report and Written Opinion received for PCT Patent Application No. PCT/US2022/028297, mailed on Mar. 13, 2023, 11 pages.
Restriction Requirement received for U.S. Appl. No. 16/941,896, mailed on Jan. 24, 2023, 06 pages.
Partial European Search Report received for European Patent Application No. 22178999.3, mailed on Oct. 10, 2022, 22 pages.
Decision to Grant received for Korean Patent Application Serial No. 10-2022-7021139, mailed on Dec. 14, 2022, 3 pages (1 page of English Translation and 2 pages of Official Copy).
Office Action received for Japanese Patent Application No. 2021-020502, mailed on Jan. 23, 2023, 6 pages (4 pages of English Translation and 2 pages of Official Copy).
Office Action received for Korean Patent Application No. 10-2021-7016081, mailed on Oct. 25, 2022, 4 pages (2 pages of English Translation and 2 pages of Official Copy).
Office Action received for Japanese Patent Application Serial No. 2021-199077, mailed on Dec. 23, 2022, 9 pages (6 pages of English Translation and 3 pages of Official Copy).
Office Action received for Korean Patent Application No. 10-2022-7028820, mailed on Dec. 15, 2022, 12 pages (6 pages of English Translation and 6 pages of Official Copy).
Extended European Search Report received for European Patent Application No. 20815113.4, mailed on Jan. 31, 2023, 14 pages.
Partial European Search Report received for European Patent Application No. 20822328.9, mailed on Feb. 6, 2023, 20 pages.
Office Action received for Korean Patent Application No. 10-2022-7004969, mailed on Jan. 9, 2023, 11 pages (6 pages of English Translation and 5 pages of Official Copy).
Office Action received for Japanese Patent Application Serial No. 2020-552870, mailed on Nov. 29, 2022, 11 pages (7 pages of English Translation and 4 pages of Official Copy).
Office Action received for Japanese Patent Application Serial No. 2022-002790, mailed on Dec. 26, 2022, 10 pages (7 pages of English Translation and 3 pages of Official Copy).
Decision to Grant received for Korean Patent Application Serial No. 10-2020-7029872, mailed on Nov. 28, 2022, 3 pages (1 page of English Translation and 2 pages of Official Copy).
Office Action received for Korean Patent Application No. 10-2022-7015754, mailed on Dec. 12, 2022, 21 pages (11 pages of English Translation and 10 pages of Official Copy).
Notice of Allowance received for U.S. Appl. No. 16/366,729, mailed on Mar. 8, 2023, 7 pages.
Extended European Search Report received for European Patent Application No. 22178999.3, mailed on Mar. 6, 2023, 25 pages.
International Search Report and Written Opinion received for PCT Patent Application No. PCT/US2022/019054, mailed on Feb. 20, 2023, 13 pages.
Office Action received for Korean Application Serial No. 10-2021-7036300, mailed on Feb. 9, 2023, 14 pages (7 pages of English Translation and 7 pages of Official Copy).
Decision to Grant received for Korean Patent Application Serial No. 10-2021-7040665, mailed on Feb. 23, 2023, 3 pages (1 page of English Translation and 2 pages of Official Copy).
Office Action received for Chinese Patent Application Serial No. 201880017776.0, mailed on Feb. 16, 2023, 22 pages (10 pages of English Translation and 12 pages of Official Copy).
Office Action received for Chinese Patent Application Serial No. 201880074279.4, mailed on Mar. 1, 2023, 23 pages (9 pages of English Translation and 14 pages of Official Copy).
Notice of Allowance received for U.S. Appl. No. 17/164,773, mailed on Apr. 5, 2023, 8 pages.
Office Action received for Japanese Patent Application Serial No. 2021-100687, mailed on Mar. 14, 2023, 05 pages. (3 pages of English Translation and 2 pages of Official Copy).
Office Action received for Japanese Patent Application No. 2020-526502, mailed on Mar. 14, 2023, 8 pages (5 pages of English Translation and 3 pages of Official Copy).
Office Action received for Japanese Patent Application No. 2021-168642, mailed on Mar. 15, 2023, 5 pages (3 pages of English Translation and 2 pages of Official Copy).
Office Action received for Japanese Patent Application No. 2022-80688, mailed on Mar. 17, 2023, 11 pages (7 pages of English Translation and 4 pages of Official Copy).
Non-Final Office Action received for U.S. Appl. No. 17/155,626, mailed on Apr. 12, 2023, 24 pages.
Notice of Allowance received for U.S. Appl. No. 16/841,930, mailed on Apr. 17, 2023, 9 pages.
Decision to Grant a Patent received for Japanese Patent Application Serial No. 2021-014376, mailed on Mar. 22, 2022, 05 pages (2 pages of English Translation and 3 pages of Official Copy).
Non-Final Office Action received for U.S. Appl. No. 17/164,773, mailed on Apr. 21, 2022, 8 pages.

(56) References Cited

OTHER PUBLICATIONS

Notice of Allowance received for Chinese Patent Application Serial No. 201880047615.6, mailed on Mar. 23, 2022, 7 pages (2 pages of English Translation and 5 pages of Official Copy).
Decision to Grant a Patent received for Korean Patent Application Serial No. 10-2018-7030512, mailed on Mar. 18, 2022, 3 pages (1 page of English Translation and 2 pages of Official Copy).
Decision to Grant a Patent received for Korean Patent Application Serial No. 10-2021-7036648, mailed on May 19, 2022, 3 pages (1 page of English Translation and 2 pages of Official Copy).
Decision to Grant a Patent received for Japanese Patent Application Serial No. 2019-549550, mailed on Feb. 25, 2022, 5 pages (2 pages of English Translation and 3 pages of Official Copy).
Office Action for Japanese Patent Application No. 2021-020502, Apr. 13, 2022, 10 pages (7 pages of English Translation and 3 pages of Official Copy).
Notice of Allowance received for U.S. Appl. No. 17/227,300, mailed on Feb. 8, 2022, 11 pages.
International Search Report and Written Opinion received for PCT Application Serial No. PCT/US2021/020749, mailed on Jan. 3, 2022, 11 pages.
International Search Report and the Written Opinion received for PCT Patent Application No. PCT/US2020/033630, mailed on Sep. 9, 2020, 9 pages.
Office Action received for Korean Application Serial No. 10-2020-7029872, mailed on Jan. 19, 2022, 32 pages (18 pages of English Translation and 14 pages of Official Copy).
Extended European Search Report received for European Patent Application Serial No. 19843301.3, mailed on Feb. 18, 2022, 10 pages.
International Preliminary Report on Patentability received for PCT Application Application No. PCT/US2020/043979, mailed on Feb. 10, 2022, 6 pages.
Office Action received for Korean Application Serial No. 10-2020-7029872, mailed on May 24, 2022, 05 pages (2 pages of English Translation and 3 pages of Official Copy).
Notice of Allowance received for Korean Patent Application Serial No. 10-2021-7006391, mailed on Feb. 9, 2022. 03 pages (1 page of English Translation and 2 pages of Official Copy).
Restriction Requirement received for U.S. Appl. No. 16/366,729, mailed on Jun. 3, 2022, 06 pages.
Office Action received for Japanese Patent Application Serial No. 2021-100687, mailed on Jul. 1, 2022, 09 pages. (6 pages of English Translation and 3 pages of Official Copy).
Restriction Requirement received for U.S. Appl. No. 16/523,459, mailed on Jun. 16, 2022, 05 pages.
Notice of Allowance received for U.S. Appl. No. 16/805,733, mailed on Aug. 22, 2022, 13 pages.
International Preliminary Report on Patentability received for PCT Application Serial No. PCT/US2021/020749, mailed on Sep. 15, 2022, 8 pages.
International Preliminary Report on Patentability received for PCT Application Serial No. PCT/US2020/033630, mailed on Dec. 9, 2021, 8 pages.
International Preliminary Report on Patentability received for PCT Application Serial No. PCT/US2021/014564, mailed on Aug. 4, 2022, 06 pages.
Notice of Allowance received for U.S. Appl. No. 16/895,588, mailed on Aug. 3, 2022, 9 pages.
Non-Final Office Action received for U.S. Appl. No. 16/366,729, mailed on Aug. 26, 2022, 09 pages.
International Search Report and Written Opinion received for PCT Patent Application No. PCT/US2018/057026, mailed on Dec. 16, 2019, 9 pages.
Office Action received for Japanese Patent Application Serial No. 2021-168642, mailed on Aug. 25, 2022, 4 pages (2 pages of English Translation and 2 pages of Official Copy).
Office Action received for Japanese Patent Application Serial No. 2020-526502, mailed on Aug. 24, 2022, 10 pages (5 pages of English Translation and 5 pages of Official Copy).
Non-Final Office Action received for U.S. Appl. No. 16/523,459, mailed on Sep. 13, 2022, 11 pages.
Notice of Allowance received for U.S. Appl. No. 16/841,930, mailed on Jun. 29, 2022, 10 pages.
International Search Report and Written Opinion received for International Patent Application No. PCT/US2020/026964, mailed on Jul. 28, 2020, 8 pages.
International Preliminary Report on Patentability for International Patent Application No. PCT/US2019/024343, mailed on Oct. 15, 2020, 9 pages.
International Search Report and Written Opinion received for PCT Patent Application No. PCT/US2017/026109, mailed on Jun. 19, 2017, 15 pages.
International Search Report and Written Opinion received for PCT Patent Application No. PCT/US2018/021553, mailed on Jun. 20, 2018, 13 pages.
International Preliminary Report on Patentability received for PCT Patent Application No. PCT/US2017/026109, mailed on Nov. 1, 2018, 13 Pages.
International Search Report and the Written Opinion received for PCT Patent Application No. PCT/US2019/024343, Jul. 12, 2019, 15 Pages.
International Search Report and the Written Opinion received for PCT Patent Application No. PCT/US2019/043674, mailed on Nov. 15, 2019, 14 pages.
International Preliminary Report on Patentability received for PCT Patent Application No. PCT/US2018/041021, mailed on Feb. 6, 2020, 10 pages.
Non-Final Office Action received for U.S. Appl. No. 16/878,140, mailed on Jun. 22, 2022, 24 pages.
Notice of Allowance received for U.S. Appl. No. 16/805,733, mailed on May 8, 2023, 5 pages.
U.S. Appl. No. 16/841,930, filed Apr. 7, 2020, USPTO.
U.S. Appl. No. 16/878,140, filed May 19, 2020, USPTO.
U.S. Appl. No. 16/895,588, filed Jun. 8, 2020, USPTO.

* cited by examiner

ADAPTIVE MULTIPLE-PULSE LIDAR SYSTEM

CROSS REFERENCE TO RELATED APPLICATION

The present application is a non-provisional application of U.S. Provisional Patent Application No. 62/866,119, filed on Jun. 25, 2019, entitled "Adaptive Multiple-Pulse LIDAR System". The entire contents of U.S. Provisional Patent Application No. 62/866,119 are herein incorporated by reference.

The section headings used herein are for organizational purposes only and should not to be construed as limiting the subject matter described in the present application in any way.

INTRODUCTION

Autonomous, self-driving, and semi-autonomous automobiles use a combination of different sensors and technologies such as radar, image-recognition cameras, and sonar for detection and location of surrounding objects. These sensors enable a host of improvements in driver safety including collision warning, automatic-emergency braking, lane-departure warning, lane-keeping assistance, adaptive cruise control, and piloted driving. Among these sensor technologies, light detection and ranging (LIDAR) systems take a critical role, enabling real-time, high-resolution 3D mapping of the surrounding environment.

The majority of commercially available LIDAR systems used for autonomous vehicles today utilize a small number of lasers, combined with some method of mechanically scanning the environment. It is highly desired that future autonomous automobiles utilize solid-state semiconductor-based LIDAR systems with high reliability and wide environmental operating ranges.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

DESCRIPTION OF VARIOUS EMBODIMENTS

Figure 1:
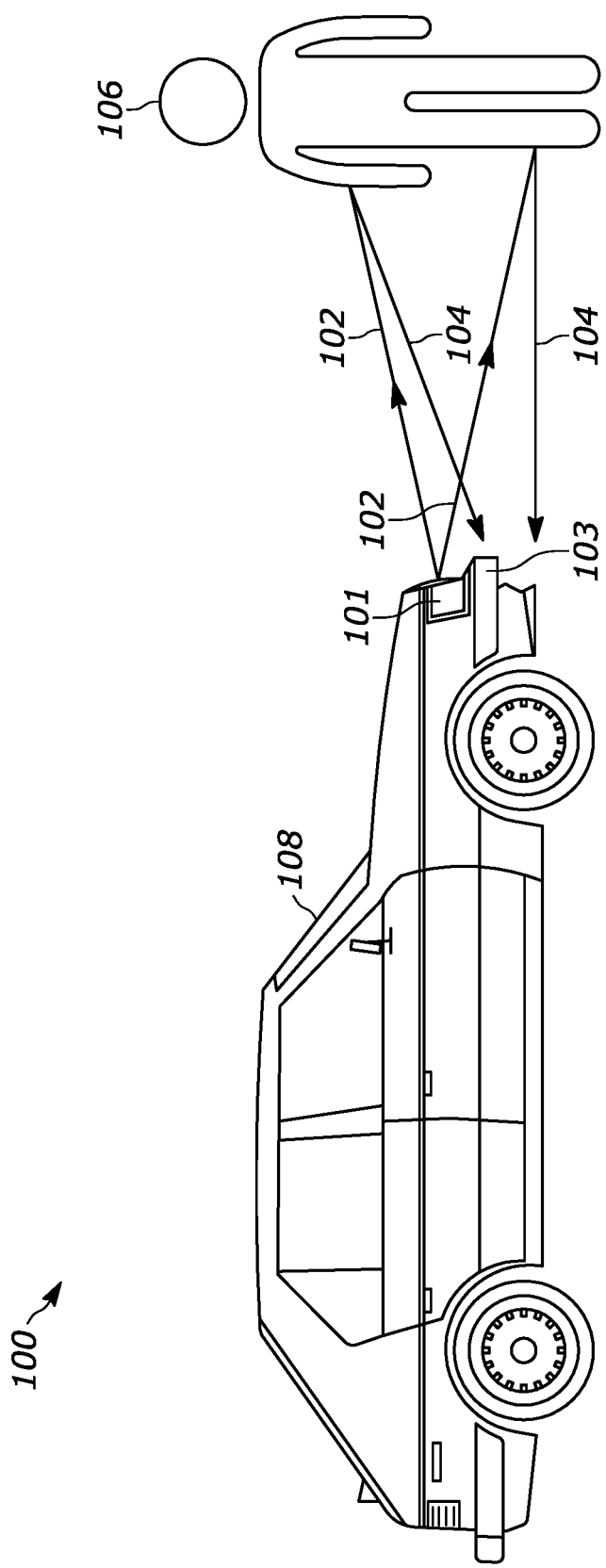
FIG. 1 illustrates the operation of an embodiment of a LIDAR system of the present teaching implemented in a vehicle.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the method of the present teaching can be performed in any order and/or simultaneously as long as the teaching remains operable. Furthermore, it should be understood that the apparatus and method of the present teaching can include any number or all of the described embodiments as long as the teaching remains operable.

The present teaching relates generally to Light Detection and Ranging (LIDAR), which is a remote sensing method that uses laser light to measure distances (ranges) to objects. LIDAR systems generally measure distances to various objects or targets that reflect and/or scatter light. Autonomous vehicles make use of LIDAR systems to generate a highly accurate 3D map of the surrounding environment with fine resolution. The systems and methods described herein are directed towards providing a solid-state, pulsed time-of-flight (TOF) LIDAR system with high levels of reliability, while also maintaining long measurement range as well as low cost.

In particular, the present teaching relates to LIDAR systems that send out a short time duration laser pulse, and use direct detection of the return pulse in the form of a received return signal trace to measure TOF to the object. The LIDAR system of the present teaching can use multiple laser pulses to detect objects in a way that improves or optimizes various performance metrics. For example, multiple laser pulses can be used in a way that improves Signal-To-Noise ratio (SNR). Multiple laser pulses can also be used to provide greater confidence in the detection of a particular object. The numbers of laser pulses can be selected to give particular levels of SNR and/or particular confidence values associated with detection of an object. This selection of the number of laser pulses can be combined with a selection of an individual or group of laser devices that are associated with a particular pattern of illumination in the FOV.

In some methods according to the present teaching, the number of laser pulses is determined adaptively during operation. Also, in some methods according to the present teaching, the number of laser pulses varies across the FOV depending on selected decision criteria. The multiple laser pulses used in some method according to the present teaching are chosen to have a short enough duration that nothing in the scene can move more than a few mm in an anticipated environment. Having such a short duration is necessary in order to be certain that the same object is being measured multiple times. For example, assuming a relative velocity of the LIDAR system and an object is 150 mph, which typical of a head on highway driving scenario, the relative speed of the LIDAR system and object is about 67 meters/sec. In 100 microseconds, the distance between the LIDAR and the object can only change by 6.7 mm, which is on the same order as the typical spatial resolution of a LIDAR. And, also that distance must be small compared to the beam diameter of the LIDAR in the case that the object is moving perpendicular to the LIDAR system at that velocity.

There is a range of distances to surrounding objects in the FOV of a LIDAR system. For example, the lower vertical FOV of the LIDAR system typically sees the surface of the road. There is no benefit in attempting to measure distances beyond the road surface. Also, there is essentially a loss in efficiency for a LIDAR system that always measures out to a uniform long distance (>100 m) for every measurement point in the FOV. The time lost in both waiting for a longer return pulse, and in sending multiple pulses, could be used to improve the frame rate and/or provide additional time to send more pulses to those areas of the FOV where objects are at long distance. Knowing that the lower FOV almost always sees the road surface at close distances, an algorithm could be implemented that adaptively changes the timing between pulses (i.e., shorter for shorter distance measurement), as well as the number of laser pulses.

The combination of high definition mapping, GPS, and sensors that can detect the attitude (pitch, roll, yaw) of the vehicle would also provide quantitative knowledge of the roadway orientation which could be used in combination with the LIDAR system to define a maximum measurement distance for a portion of the field-of-view corresponding to the known roadway profile. A LIDAR system according to the present teaching can use the environmental conditions, and data for the provided distance requirement as a function of FOV to adaptively change both the timing between pulses, and the number of laser pulses based on the SNR, measurement confidence, or some other metric.

An important factor in the overall system performance is the number of pulses used to fire an individual or group of lasers in a single sequence for the full FOV, which is sometimes referred to in the art as a single frame. Embodiments that use laser arrays may include hundreds, or even thousands, of individual lasers. All or some of these lasers may be pulsed in a sequence or pattern as a function of time in order that an entire scene is interrogated. For each laser fired a number (N times), the measurement time increases by at least a factor of N. Therefore, measurement time increases by increasing the number of pulse shots from a given laser or group of lasers, thereby reducing the frame rate.

FIG. 1 illustrates the operation of a LIDAR system 100 of the present teaching implemented in a vehicle. The LIDAR system 100 includes a laser projector 101, also referred to as an illuminator, that propagates light beams 102 generated by a light source toward a target scene and a receiver 103 that receives the light 104 that reflects from an object, shown as a person 106, in that target scene. In some embodiments, the illuminator comprises a laser transmitter and various transmit optics.

LIDAR systems typically also include a controller that computes the distance information about the object (person 106) from the reflected light. In some embodiments, there is also an element that can scan or provide a particular pattern of the light that may be a static pattern, or a dynamic pattern across a desired range and field-of-view (FOV). A portion of the reflected light from the object (person 106) is received in a receiver. In some embodiments, a receiver comprises receive optics and a detector element that can be an array of detectors. The receiver and controller are used to convert the received signal light into measurements that represent a pointwise 3D map of the surrounding environment that falls within the LIDAR system range and FOV.

Some embodiments of LIDAR systems according to the present teaching use a laser transmitter that is a laser array. In some specific embodiments, the laser array comprises VCSEL laser devices. These may include top-emitting VCSELs, bottom-emitting VCSELs, and various types of high-power VCSELs. The VCSEL arrays may be monolithic. The laser emitters may all share a common substrate, including semiconductor substrates or ceramic substrates.

In some embodiments, individual lasers and/or groups of lasers in embodiments that use one or more transmitter arrays can be individually controlled. Each individual emitter in the transmitter array can be fired independently, with the optical beam emitted by each laser emitter corresponding to a 3D projection angle subtending only a portion of the total system field-of-view. One example of such a LIDAR system is described in U.S. Patent Publication No. 2017/0307736 A1, which is assigned to the present assignee. The entire contents of U.S. Patent Publication No. 2017/0307736 A1 are incorporated herein by reference. In addition, the number of pulses fired by an individual laser, or group of lasers can be controlled based on a desired performance objective of the LIDAR system. The duration and timing of this sequence can also be controlled to achieve various performance goals.

Some embodiments of LIDAR systems according to the present teaching use detectors and/or groups of detectors in a detector array that can also be individually controlled. See, for example, U.S. Provisional Application No. 62/859,349, entitled "Eye-Safe Long-Range Solid-State LIDAR System". U.S. Provisional Application No. 62/859,349 is assigned to the present assignee and is incorporated herein by reference. This independent control over the individual lasers and/or groups of lasers in the transmitter array and/or over the detectors and/or groups of detectors in a detector array provide for various desirable operating features including control of the system field-of-view, optical power levels, and scanning pattern.

Figure 2A:
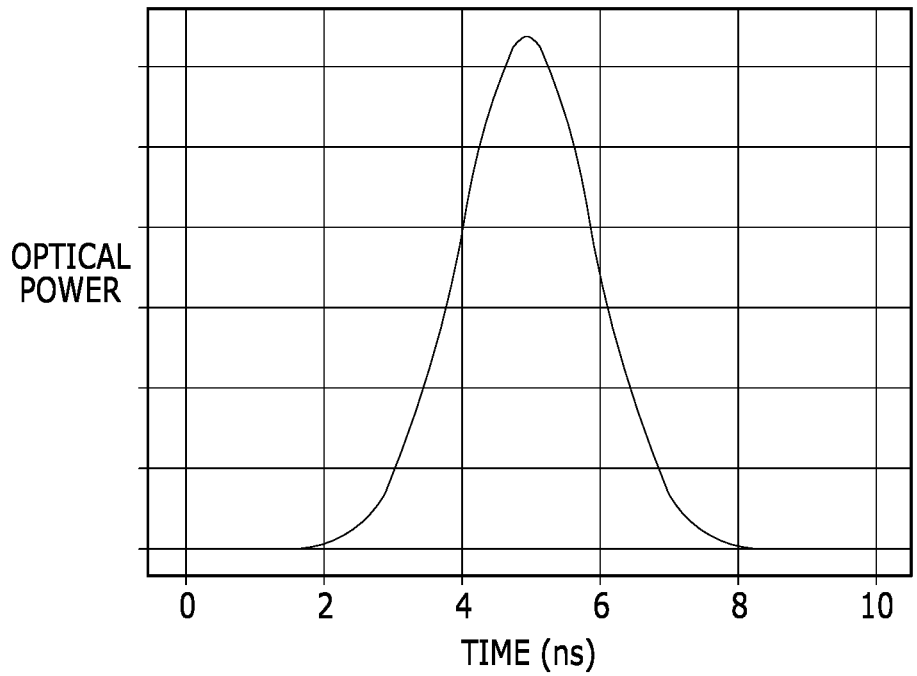
FIG. 2A illustrates a graph showing a transmit pulse of an embodiment of a LIDAR system of the present teaching.

FIG. 2A illustrates a graph 200 of a transmit pulse of an embodiment of a LIDAR system of the present teaching. The graph 200 shows the optical power as a function of time for a typical transmit laser pulse in a LIDAR system. The laser pulse is Gaussian in shape as a function of time and typically about five nanoseconds in duration. In various embodiments, the pulse duration takes on a variety of values. In general, the shorter the pulse duration the better the performance of the LIDAR system. Shorter pulses reduce uncertainty in the measured timing of the reflected return pulse. Shorter pulses also allow higher peak powers in the typical situation when eye safety is a constraint. This is because for the same peak power, shorter pulses have less energy than longer pulses.

In order to be able to average multiple pulses to provide information about a particular scene, the time between pulses should be relatively short. In particular, the time between pulses should be faster than the motion of objects in a target scene. For example, if objects are traveling at a relative velocity of 50 m/sec, their distance will change by 5 mm within 100 µsec. Thus, in order to not have ambiguity about the target distance and the target itself, a LIDAR system should complete all pulse averaging where the scene is quasi-stationary and the total time between all pulses is on the order of 100 µsec. Certainly, there is interplay between these various constraints. It should be understood that there are various combinations of particular pulse durations, number of pulses, and the time between pulses or duty cycle that can be used to meet various desired performance objectives. In various embodiments, the specific physical architectures of the lasers and the detectors and control schemes of the laser firing parameters are combined to achieve a desired performance.

Figure 2B:
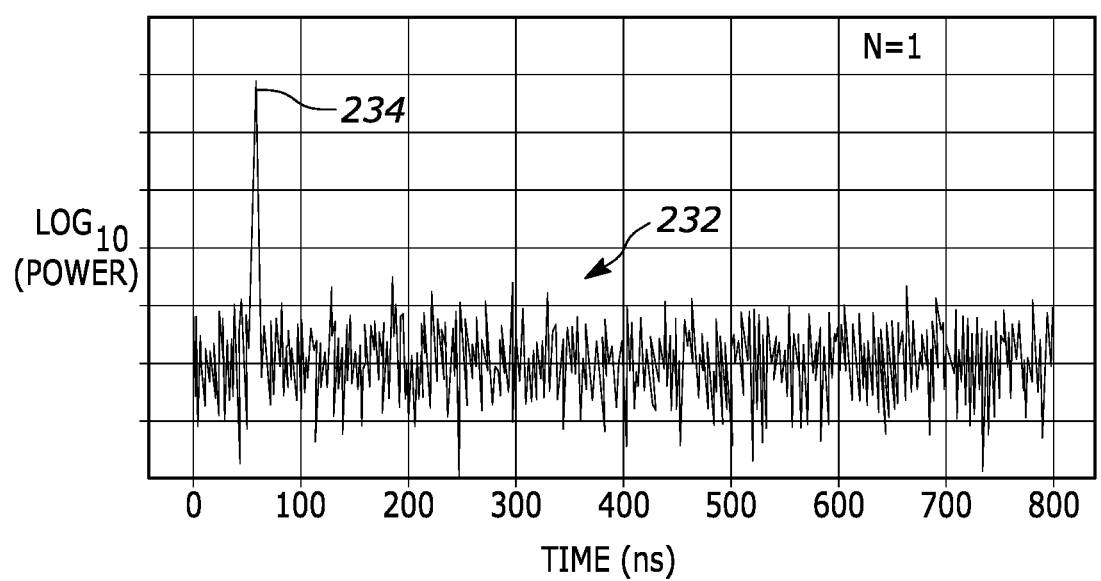
FIG. 2B illustrates a graph showing a return signal of an embodiment of a LIDAR system of the present teaching.

FIG. 2B illustrates a graph 230 of a return signal of an embodiment of a LIDAR system of the present teaching. This type of graph is sometimes referred to as a return signal trace. A return signal trace is a graph of a detected return signal from a single transmitted laser pulse. This particular graph 230 is a simulation of a detected return pulse. The $LOG_{10}(POWER)$ of the detected return signal is plotted as a function of time. The graph 230 shows noise 232 from the system and from the environment. There is a clear return pulse peak 234 at ~60 nanoseconds. This peak 234 corresponds to reflection from an object at a distance of nine meters from the LIDAR system. Sixty nanoseconds is the time it takes for the light to go out to the object and back to the detector when the object is nine meters away from the transmitter/receiver of the LIDAR system. The system can be calibrated such that a particular measured time of a peak is associated with a particular target distance.

Figure 2C:
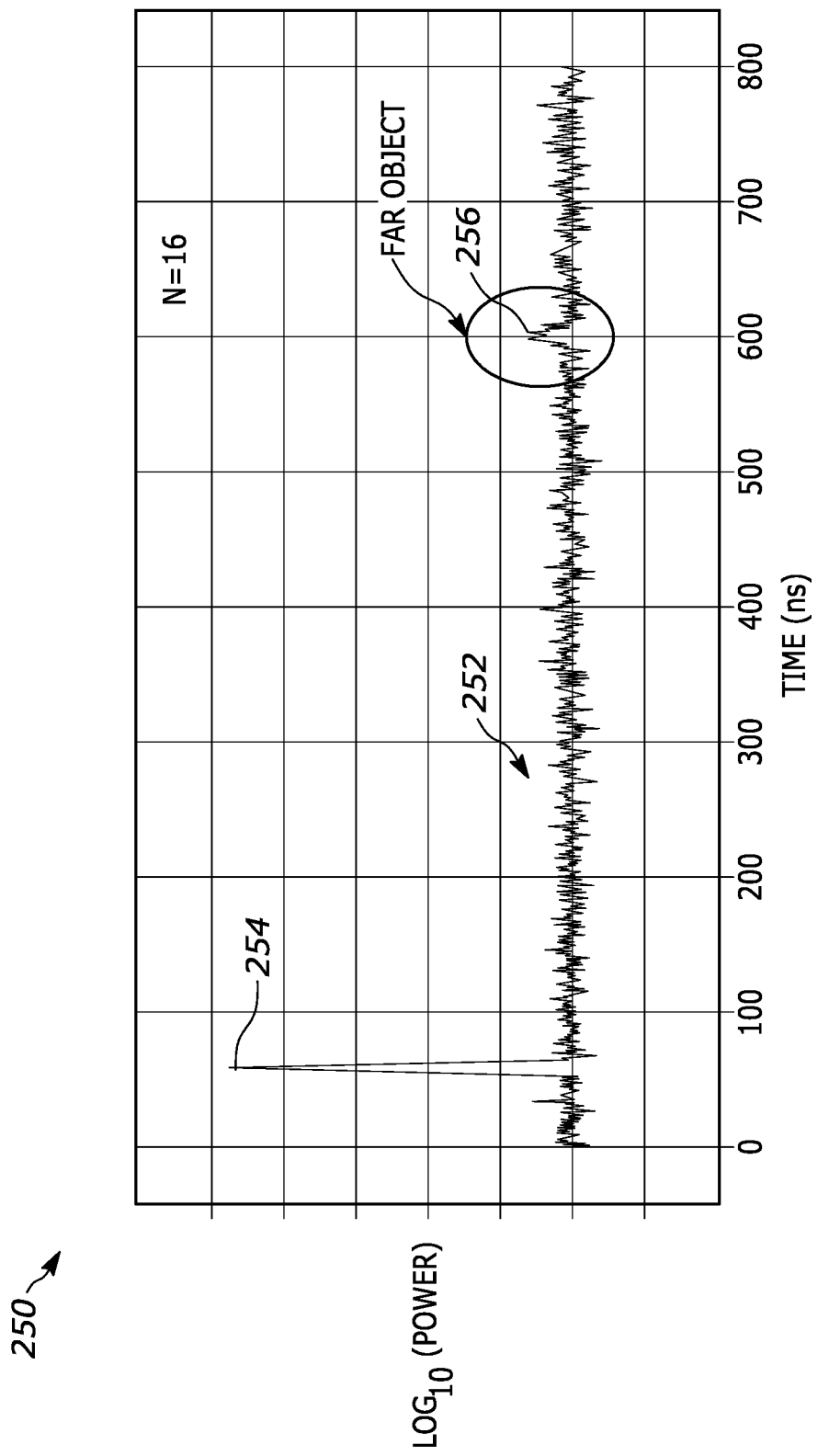
FIG. 2C illustrates a graph showing an average of sixteen return signals of an embodiment of a LIDAR system of the present teaching.

FIG. 2C illustrates a graph 250 of an average of sixteen return signals of an embodiment of a LIDAR system of the present teaching. The graph 250 illustrates a simulation in which a sequence of sixteen returns, each similar to the return signal in the graph 230 of FIG. 2B, are averaged. The sequence of sixteen returns is generated by sending out a sequence of sixteen single pulse transmissions. As can be seen, the spread of the noise 252 is reduced through the averaging. In this simulation, noise is varying randomly. The scene (not shown) for the data in this graph is two objects in the FOV, one at nine meters, and one at ninety meters. It can be seen in the graph 250 that there is a first return peak 254 that can be seen at about 60 nanoseconds and a second return peak 256 can be seen at about 600 nanoseconds. This second return peak 256 corresponds to the object located at a distance of ninety meters from the LIDAR system. Thus, each single laser pulse can produce multiple return peaks 254, 256 resulting from reflections off objects that are located at various distances from the LIDAR system. In general, intensity peaks reduce in magnitude with increasing distance from the LIDAR system. However, the intensity of the peaks depends on numerous other factors such as physical size and reflectivity characteristics.

Figure 3A:
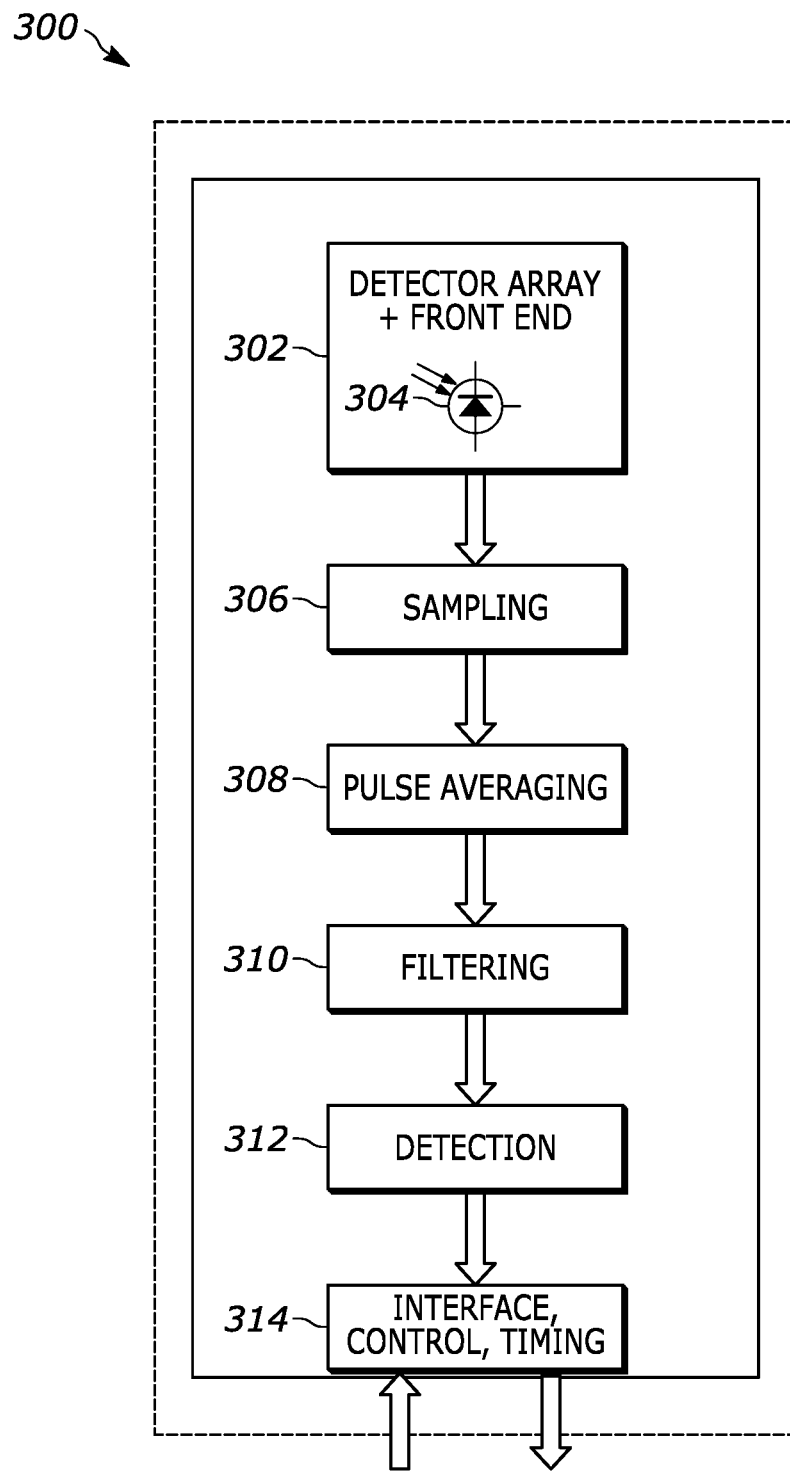
FIG. 3A illustrates an embodiment of a receiver of a LIDAR system of the present teaching.

FIG. 3A illustrates an embodiment of a receiver 300 of a LIDAR system of the present teaching. The receiver 300 includes a sensor 302 that includes a detector array 304 and associated front end electronic circuitry (not shown). The front-end circuitry can include, for example, a low noise amplifier. A digital sampling circuit 306 samples the detector signal. A pulse averaging circuit 308 averages the sampled detected signal. Averaging improves the signal-to-noise ratio. The signal-to-noise ratio of the received signal improves as the square root of N for N signals that are averaged, assuming that the noise is Gaussian noise. An electrical filtering circuit 310 filters the averaged signal. The filtering of the received signal can include a variety of filtering types including hardware-based filtering and/or software-based filtering. The filtering can include analog and/or digital filtering. A detection processing circuit 312 processes the filtered signal and determines detection metrics that can include, for example, object identification and ranging information.

The receiver 300 also includes an interface, and control and timing electronics 314 that controls the operation of the receiver 300 and provides data to the system. The interface 314 provides an output signal, such as a 3D measurement point cloud. Other output signals that can be provided include, for example, raw TOF data and/or processed TOF data. The interface 314 also receives control and/or data signals from other circuits and devices in the system. For example, the interface 314 can receive data from a variety of sensors, such as ambient light sensors, weather sensors, and/or atmospheric condition sensors.

Figure 3B:
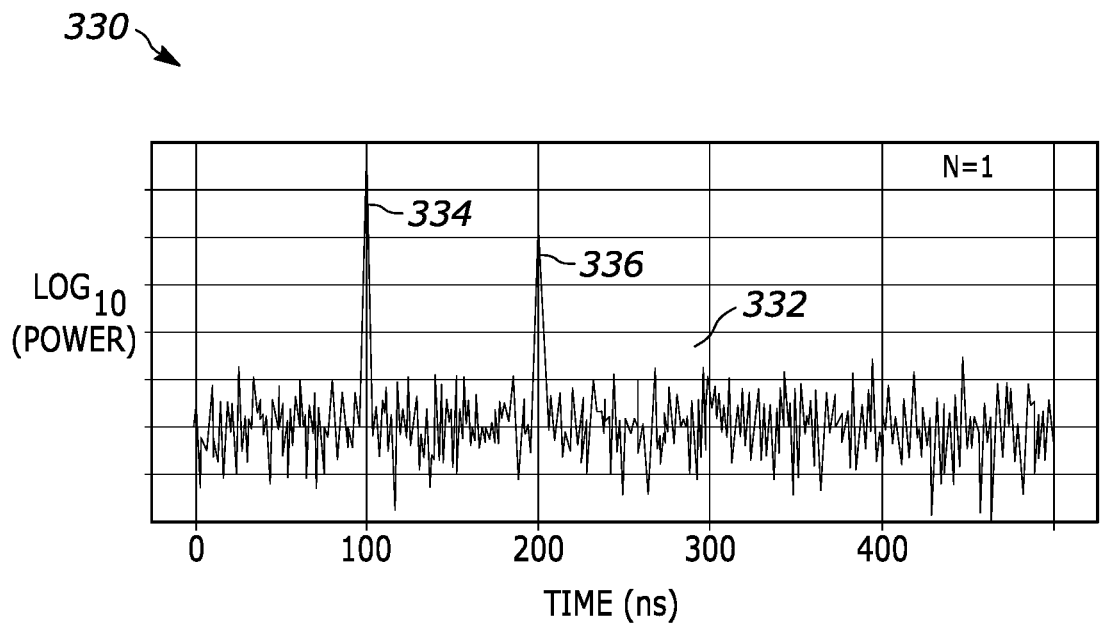
FIG. 3B illustrates a graph showing power as a function of time for a return signal generated by an embodiment of a LIDAR system of the present teaching.

FIG. 3B illustrates a graph 330 of power as a function of time for a return signal generated by a LIDAR system of the present teaching. The graph 330 shows the noise 332 and two clear return pulse peaks 334, 336. A first peak 334 is at one hundred nanoseconds, and a second peak 336 is at two hundred nanoseconds. This graph 330 represents data for a single laser transmit pulse return signal.

Figure 3C:
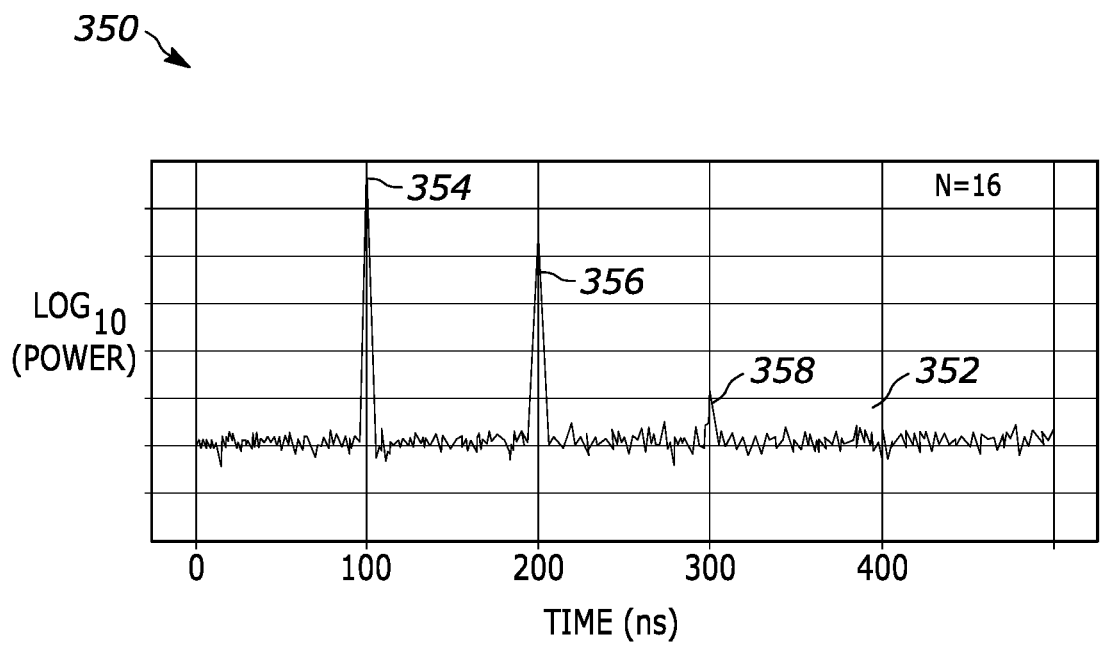
FIG. 3C illustrates a graph of an average of sixteen return signals for the embodiment of the LIDAR system described in connection with FIG. 3B.

FIG. 3C illustrates a graph 350 of an average of sixteen return signals for the embodiment of the LIDAR system described in connection with FIG. 3B. This graph 350 represents an average of sixteen independent laser transmit pulse return signals. The graph 350 shows the reduced noise 352 which results from the signal averaging. In addition to the two early strong peaks, a peak 354 at one hundred nanoseconds and a peak 356 at two hundred nanoseconds, there is a peak 358 visible at three hundred nanoseconds. Averaging over a number of return signals reduces the noise level 352, which allows smaller peak return signals to be identified and measured. Generally, the return signals from objects at further distances are weaker for similar objects. Using larger numbers of averaged return signals allows for more distant objects to be detected. In general, more averaging allows objects with weaker reflected signals to be detected.

Also, in general, the number of return signals used in the average corresponds to a particular SNR in the averaged return signal trace. The SNR can then be associated with a particular maximum detected range. Thus, the average number may be chosen to provide a particular SNR and/or to provide a particular maximum detected range.

Figure 4:
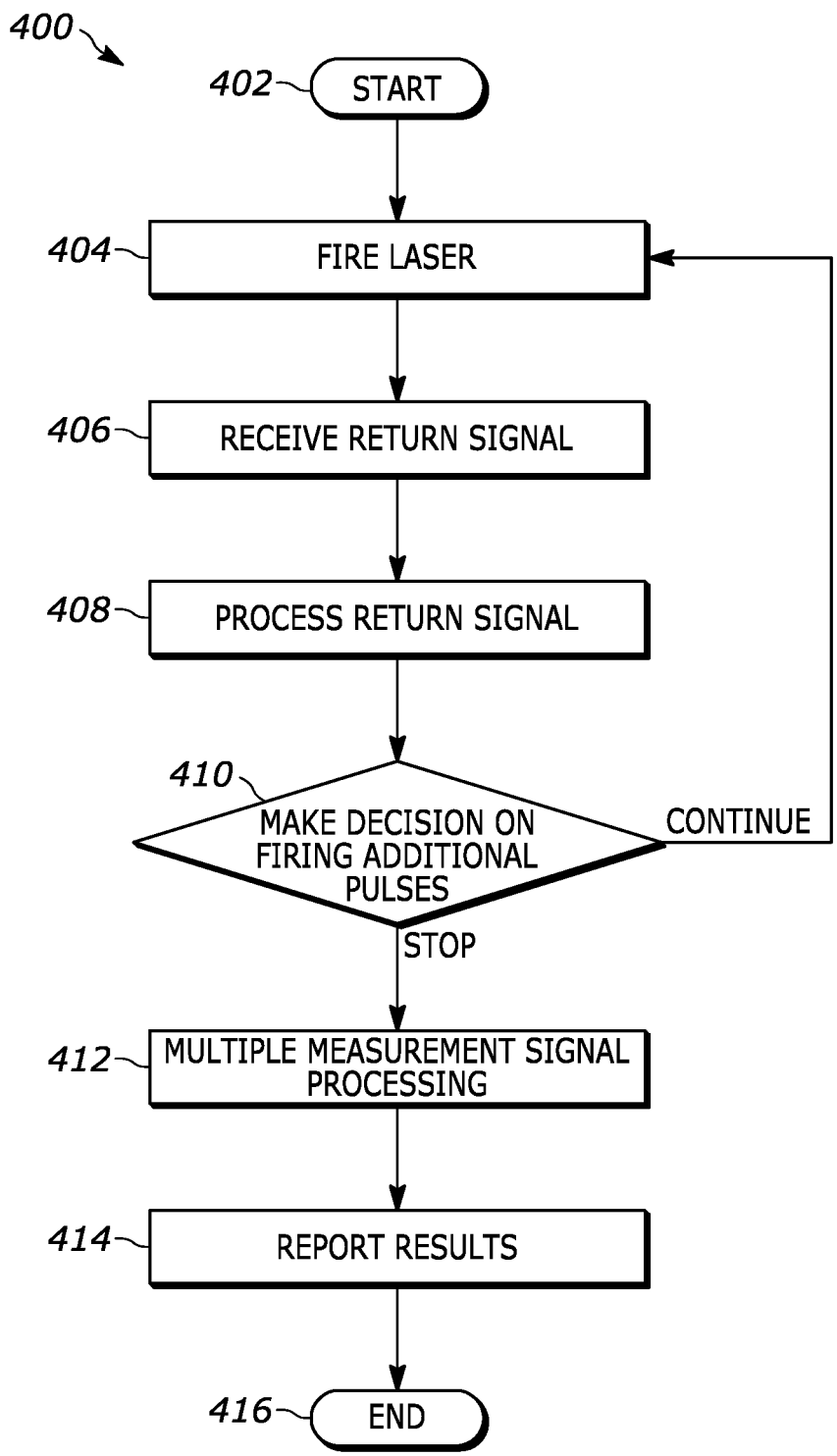
FIG. 4 illustrates a flow chart of a method of controlling the firing of a laser used to initiate measurements in a LIDAR system of the present teaching.

FIG. 4 illustrates a flow chart of a method 400 of controlling the firing of a laser used to initiate measurements in a LIDAR system of the present teaching. In a first step 402, measurement is initiated. In a second step 404, a selected laser is fired. That is, an individual laser is controlled to initiate a single measurement by generating an optical pulse. It should be understood that in various methods according to the present teaching, selected individual and/or groups of lasers are fired to generate a single pulse of light, such that a desired pattern of laser FOVs are illuminated on a given single-fire measurement cycle.

In a third step 406, a reflected return signal is received by the LIDAR system. In a fourth step 408, the received reflected return signal is processed. In some methods, the processing of the return signal determines the number of return peaks. In some methods, the processing calculates a distance to the object based on time-of-flight (TOF). In some methods, the processing determines the intensity, or the pseudo-intensity, of the return peaks. Various combinations of these processing results can be provided. Intensity can be directly detected with p-type-intrinsic-n-type-structure detectors (PIN) or Avalanche Photodetector (APD). Also intensity can be detected with Silicon Photo-Multiplier (SiPM) or Single Photon Avalanche Diode Detector (SPAD) arrays that provide a pseudo-intensity based on number of pixels that are triggered simultaneously. Some methods further determine noise levels of the return signal traces. In various methods, additional information is also considered, for example, ambient light levels and/or a variety of other environmental conditions and/or factors. Environmental conditions include, for example, temperature, humidity, weather, atmospheric conditions (e.g., presence of fog, smoke), etc.

In a fifth step 410, a decision is made about firing the laser to generate another pulse of light from the laser. If the decision is yes, the method proceeds back to the second step 404. In various methods, the decision can be based on, for example, a decision matrix, an algorithm programmed into the LIDAR controller, and/or a lookup table. A particular number of laser pulses are then generated by cycling through the loop including the second step 404, third step 406, and the fourth step 408 until the desired number of laser pulses have been generated causing a decision to stop firing the laser(s). The desired number can be predetermined, based on a performance criteria, based on information about environment conditions, and/or based on determined information, such as information determined from sensors.

After all the desired laser pulses have been generated, the system performs one or more of multiple measurement signal processing steps in a sixth step 412. In various methods, the multiple measurement signal processing steps can include, for example, filtering, averaging, and/or histogramming. The multiple measurement signal processing results in a final resultant measurement from the processed data of the multiple-pulse measurements. These resultant measurements can include both raw signal trace information and processed information. The raw signal information can be augmented with flags or tags that indicate probabilities or confidence levels of data as well as metadata related to the processing the sixth step 412.

In a seventh step 414, the information determined by the multiple measurement signal processing is then reported. The reported data can include, for example, the 3D measurement point data, and/or various other metrics including number of return peaks, time of flight(s), return pulse(s) amplitude(s), errors and/or a variety of calibration results. In an eighth step 416 the method is terminated.

It should be understood that the method 400 described in connection with FIG. 4 is generally described for energizing or firing a single laser. In many practical embodiments, arrays of lasers and arrays of detectors are used. It should further be understood that the method 400 can be easily extended to arrays of lasers and/or arrays of detectors. There are many ways of selecting individual and/or groups of lasers and/or detectors. See, for example, U.S. Provisional Patent Application No. 62/831,668 and U.S. patent application Ser. No. 16/841,930 both entitled "Solid-State LIDAR Transmitter with Laser Control". See also U.S. Provisional Application No. 62/859,349 and U.S. patent application Ser. No. 16/895,588 both entitled "Eye-Safe Long-Range Solid-State LIDAR System", and U.S. patent application Ser. No. 16/366,729, entitled "Noise Adaptive Solid-State LIDAR System". These patent applications are assigned to the present assignee and are incorporated herein by reference. The firing of a laser as described in connection with FIG. 4 from a group of lasers would, for example, cause each laser in the group of lasers to emit a single pulse during that firing event. Each time the decision step 410 is to continue, that same group of lasers will be fired again. This continues until the desired number of pulses for a measurement is implemented, and the decision 410 is to stop.

One feature of the present teaching is that a variety of methods can be used to determine the number of laser pulses generated. The decision criteria can be dynamic or static. By using dynamic decision criteria, the system can vary the number of single pulse measurements that are used to obtain a resultant measurement. For example, dynamic decision criteria can be based on conditions that arise during the measurement activity. This allows the LIDAR system to dynamically respond to the environment. Alternatively, systems according to the present teaching can be static or quasi-static, and can operate with a predetermined set of performance capabilities. Combinations of dynamic and static operation are also possible.

Figure 5:
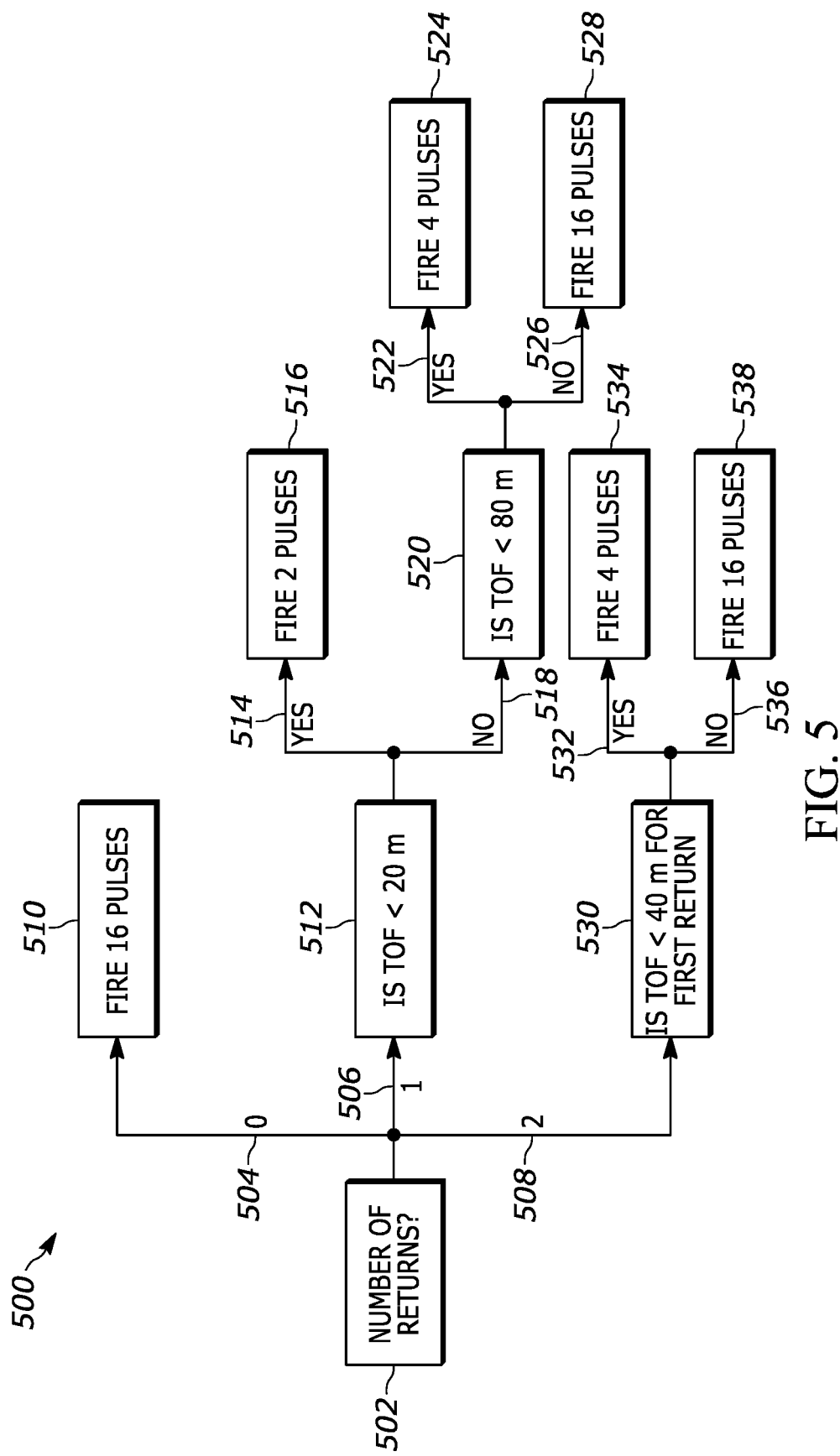
FIG. 5 illustrates a decision tree for determining the number of pulses to average for a LIDAR system of the present teaching.

FIG. 5 illustrates a decision tree 500 for determining the number of pulses to average for a LIDAR system of the present teaching. This particular example of a decision tree 500 would, in many cases, result in the generation of sixteen laser pulses for each resultant measurement. However, when a close object is detected with a return signal having a relatively high SNR, the number of pulses used would typically reduce. By reducing the number of pulses, the overall system frame rate can be faster than it would be if a fixed number of sixteen laser pulses were used for every measurement.

In the decision tree 500, the first decision node 502 generates branches 504, 506, 508 based on a test for the number of peaks detected in a return signal trace. If no return peaks (or pulses) are detected in the first decision node 502, the first branch 504 is taken leading to instruction node 510 and selected sixteen transmit pulses. This instruction results because any object in the scene is at the detection limit of the system, so averaging a full sixteen sets of return traces is advantageous.

If the first decision node 502 results in a single return pulse, branch 506 is followed to decision node 512. This decision node 512 asks if the detected object is less than a distance of 20 meter. If so, branch 514 is taken leading to instruction node 516 that initiates the generation of two laser pulses. If decision node 512 determines from the TOF analysis of the trace that the object is greater than 20 meters, the decision tree 500 follows branch 518 to decision node

520. If decision node 520 determines from a TOF analysis of peaks that the measured returns are less than 80 meters, then branch 522 is followed to instruction node 524 that initiates generating four laser pulses so that the resulting four return traces can be averaged. If decision node 520 determines from a TOF analysis of peaks that the returns are from objects greater than 80 meters, branch 526 is followed to instruction node 528 that initiates sixteen laser pulses so that the resulting sixteen return traces can be averaged.

If the decision node 502 determines that the number of peaks in the return is at least two, then path 508 is followed to decision node 530. This decision node 530 determines if the presence of the closest object is greater than or less than 40 meters. Less than 40 meters results in path 532 being followed to instruction node 534 that initiates the generation of four laser pulses. Greater than 40 meters results in path 536 being followed to the instruction node 538 that initiates the generation of sixteen laser pulses. Thus, in the case of two objects, here again, scenes with closer objects merit fewer number of averages, and thus faster frame rates as compared to scenes that include further objects.

The decision tree 500 can be generally characterized as a peak number and TOF based decision tree. Thus, the decision tree 500 includes nodes that decide how many peaks are in a return and/or what the object position associated with the TOF of those peaks is, and determines a number of subsequent laser pulses to fire based on the results of those decisions. The decision tree 500 of FIG. 5 is just one simple example to illustrate the concept of the present teaching. It should be understood that systems and methods according to the present teaching could have a much more complicated decision tree based on peak number and TOF. In various embodiments, the peak number and TOF based decision trees take into account other information available to the system. These additional decision criteria include, for example, the intensity of return signals, environmental conditions, object scene conditions, noise levels, and various other criteria based on system information. This additional information can be used to change the values in the various nodes of the decision tree, such as number of peaks, distances associated with TOF thresholds and/or number of pulses.

Decision trees according to the present teaching can also include more complicated branching and decisions schemes. In various embodiments, decision tree instruction nodes can be static or dynamic or have some aspects of both static or dynamic decision making. For example, the decision tree nodes, such as nodes 510, 516, 524, 528, 534 and 538 that set a number of laser pulses can be updated to a different number of laser pulses fired based on each subsequent firing of the laser, and not set as fixed based only on the first laser pulse fired for a new measurement.

Figure 6:
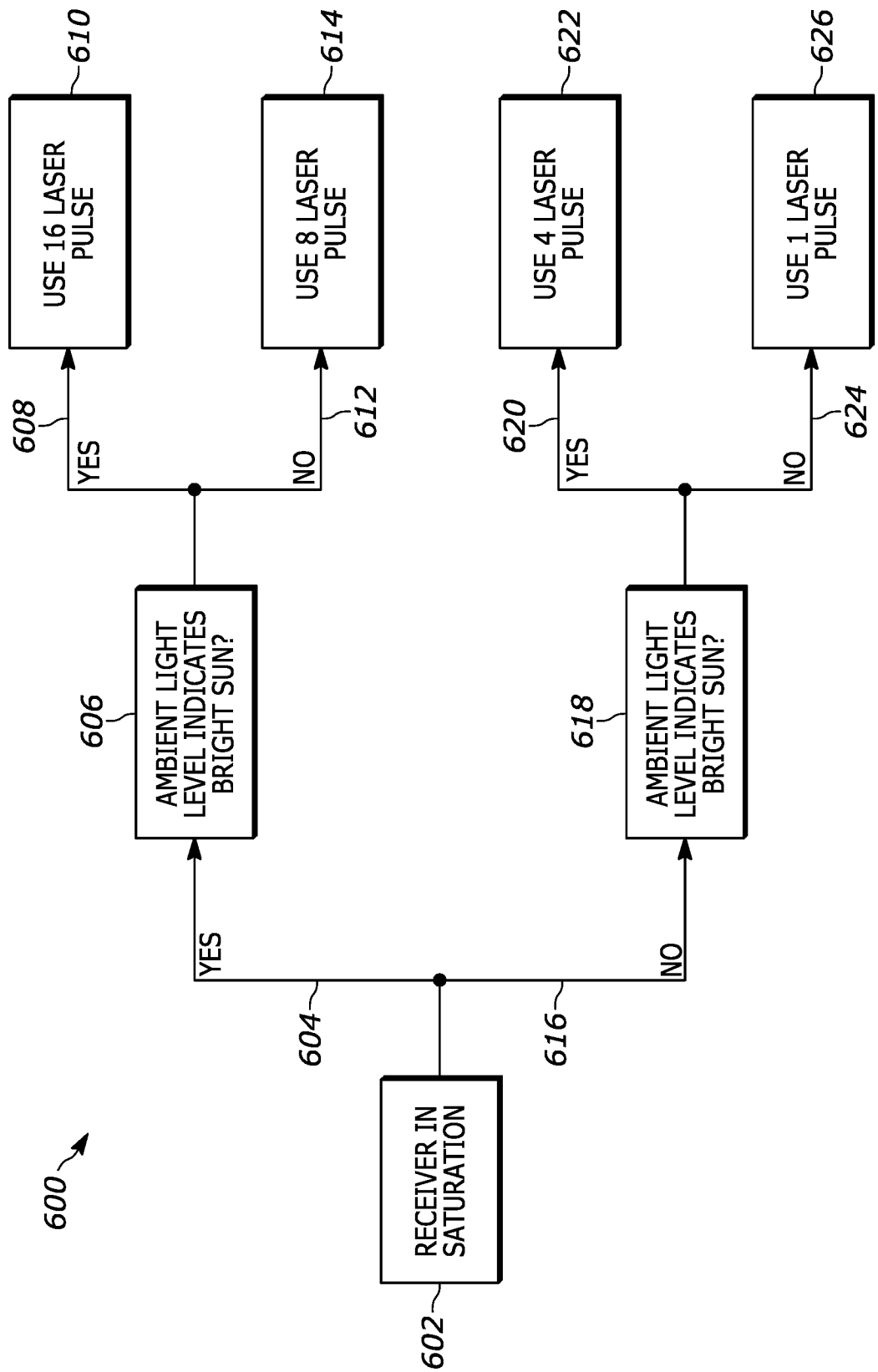
FIG. 6 illustrates a decision tree for determining the number of pulses to average for a LIDAR system of the present teaching.

FIG. 6 illustrates another embodiment of a decision tree 600 for determining the number of pulses to average for a LIDAR system of the present teaching. This decision tree 600 does not require the calculation of TOF and thus is particularly useful when computing TOF is time and resource intensive. The first decision 602 in the decision tree 600 is a determination of whether the intensity of the received pulse is strong enough to put the receiver into saturation. For example, with both APD and SPAD detectors, the level of peak output from the sensor can be measured and used to determine if the return level is strong enough to saturate the detector.

The second decisions in decision nodes 606, 618 in the decision tree 600 are dependent on the ambient light level. Most LIDAR systems have capability to monitor the ambient light level. For example, ambient light may be easily determined from the background noise level of the receiver when no transmitter pulse is being sent. The ambient light level value can be measured at some appropriate interval, such as once per frame and stored for use in the decision tree 600. Based on these two criteria, a determination of whether the receiver is in saturation and a determination of the ambient light level, different numbers of laser pulses are chosen for averaging/histogramming to obtain a calculated TOF measurement. In general, these two decisions taken together are an indication of the signal-to-noise level of the return pulse. This allows the system to use a fewer number of pulses when the signal-to-noise level is higher.

More specifically, decision node 602 determines if the receiver is in saturation. For example, a processor in the receiver that is monitoring for a saturation condition may provide this saturation information. If a saturation condition is determined, path 604 is taken to decision node 606 where a determination is made whether the ambient light level indicates that there is a bright sun. The ambient light level may be taken from a monitor within the LIDAR. Alternatively, this information may be provided from outside of the LIDAR system. If the ambient light level does indicate bright sun, then path 608 is followed and a sixteen-pulse laser measurement is instructed by instruction node 610. This is because a high ambient light level will require more averaging to provide a good signal-to-noise ratio. If the ambient light level does not indicate a bright sun, then path 612 is followed to instruction node 614 that initiates the generation of eight laser pulses. Fewer pulses are required because the ambient light level is lower. Thus, higher background light conditions result in more averaging than lower background light conditions.

If decision node 602 determines that the receiver is not in saturation, path 616 is followed to decision node 618. Decision node 618 determines whether the ambient light level indicates a bright sun, and if so, follows path 620 to an instruction node 622 that initiates a four laser pulse firing sequence. If decision node 618 determines there is not a bright sun ambient light level, then path 624 is followed and the instruction node 626 initiates a single pulse laser sequence. If the receiver is not in saturation, and there is not a high background level, no averaging is needed. As described herein, using only a single pulse while still realizing a high signal-to-noise ratio and/or other high quality measurement performance allows for faster frame rates.

Thus, in some methods according to the present teaching, if the receiver is in saturation, then a larger number of laser pulse are generated to allow more averaging and/or histogramming at the output of the detector. Using a larger number of laser pulses per measurement increases signal-to-noise ratio via more averaging. Consequently, an indication of bright sunlight will result in more pulse firings than when lower ambient light conditions are detected, which improves signal-to-noise ratio over the bright background. In this example, high ambient uses sixteen pulses, and low ambient light conditions uses eight pulses. When the receiver is not saturated and the ambient light conditions is low, a single pulse may be used. When the receiver is not in saturation but the ambient light conditions is high, four pulses are used. Thus, one aspect of the present teaching, as described in connection with the decision tree 600 of FIG. 6, is that the smallest number of laser pulses needed to provide a desired signal-to-noise ratio or other performance metric can be employed to make LIDAR systems more efficient in general. For example, using the methods according to the present teaching that generate a lower number of pulse when appropriate reduce the average number of required laser pulses and also reduce the time it takes to complete a measurement.

One skilled in the art will appreciate that as with the decision tree 500 described in connection with FIG. 5, the decision tree 600 could be expanded to have a much more complicated decision tree that utilizes additional information and decision criteria, such as an intensity of return, environmental conditions, object scene conditions, noise levels and/or various other criteria based on system information. Decisions trees according to the present teaching can also include more complex decision branching.

In various embodiments, decision tree instruction nodes can be static, dynamic, or a combination of static and dynamic. For example, in decision tree 600, instruction nodes 610, 614, 622, 626, that set a number of laser pulses, can be updated to initiate the generation of different numbers of laser pulses based on each subsequent firing of the laser instead of being fixed based only on the first laser pulse fired for a new measurement. The number of laser pulses fired in any or all of the instruction nodes 610, 614, 622, 626 can, for example, be updated at regular intervals during a measurement. The number of laser pulses fired in any or all of the instruction nodes can also be based on post-processed measurement results. Similarly, thresholds for saturation or ambient light levels or other criteria can be either static or dynamic.

Thus, various embodiments of decision trees of the present teaching utilize decision nodes that include decision thresholds based on, for example, external conditions, internal conditions, specific measurement results or combinations of these factors. Various embodiments of decision trees of the present teaching utilize instruction nodes that define a number of pulses used in a resultant measurement. Other instructions can include, for example, peak power, maximum permissible exposure (MPE) thresholds, illumination patterns, FOVs, and other transmitter configuration settings.

One feature of the present teaching is that the LIDAR systems that utilize multiple laser pulses, and the subsequent processing of the associated multiple return pulse traces, can also detect false alarms with relatively high probabilities. False alarms include, for example, detecting a peak that corresponds to a position that does not have an object. Such a false alarm event could arise from various causes. For example, spurious noise can occur. Interference from other LIDAR systems is also a possible source of noise. FIGS. 7A-D show an example of how this happens.

Figure 7A:
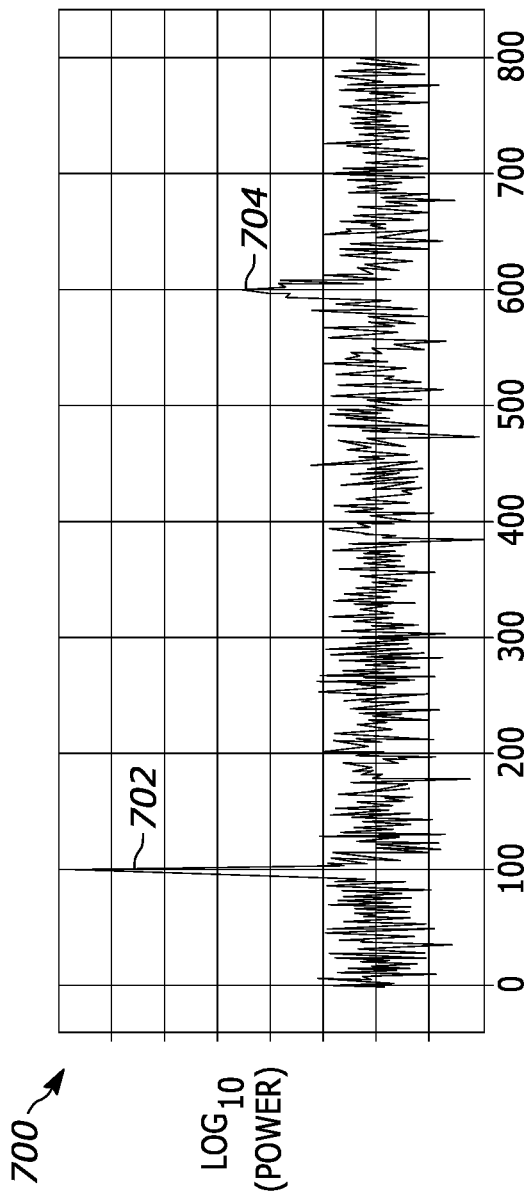
FIG. 7A illustrates a return pulse trace for a single laser shot of a particular scene of an embodiment of a LIDAR system of the present teaching.
Figure 7B:
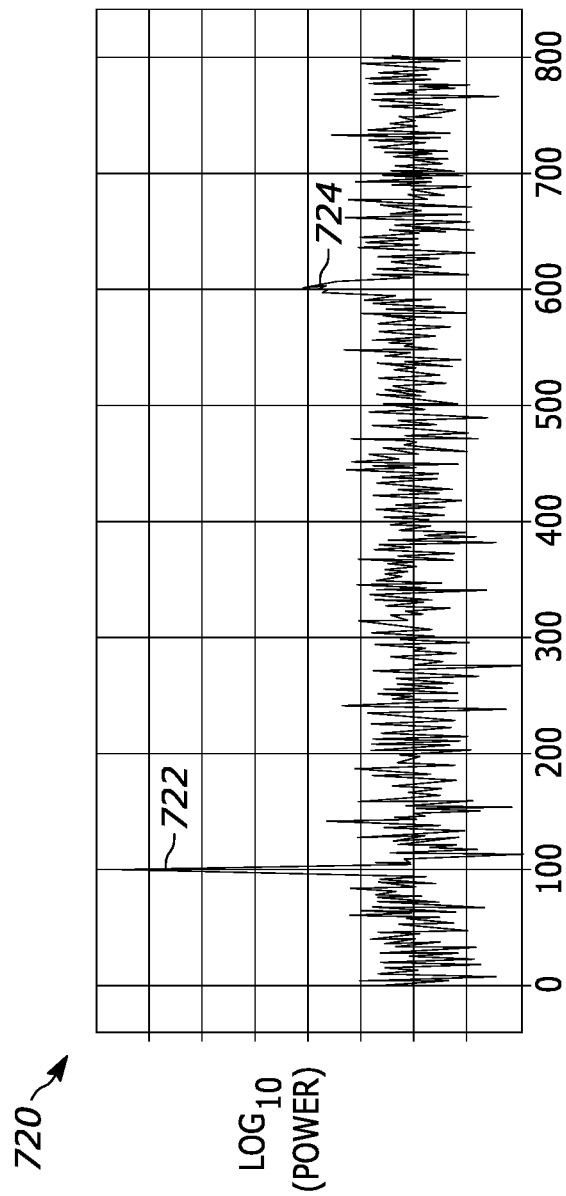
FIG. 7B illustrates a return pulse trace for another single laser shot of the same particular scene of the embodiment of the LIDAR system described in connection with FIG. 7A.
Figure 7C:
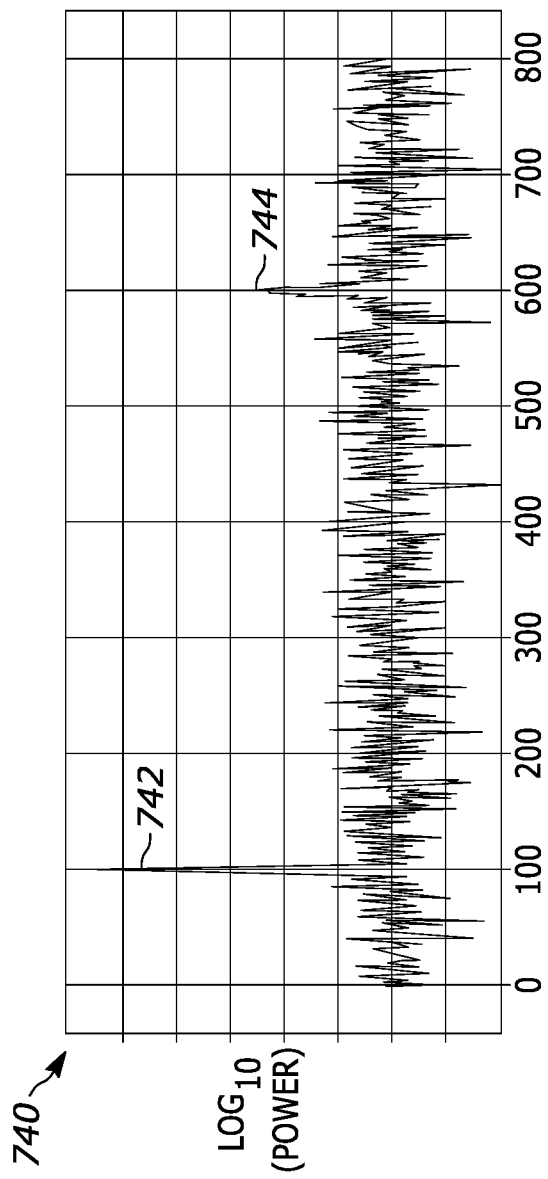
FIG. 7C illustrates a return pulse trace for another single laser shot of the same particular scene of the embodiment of the LIDAR system described in connection with FIG. 7A.
Figure 7D:
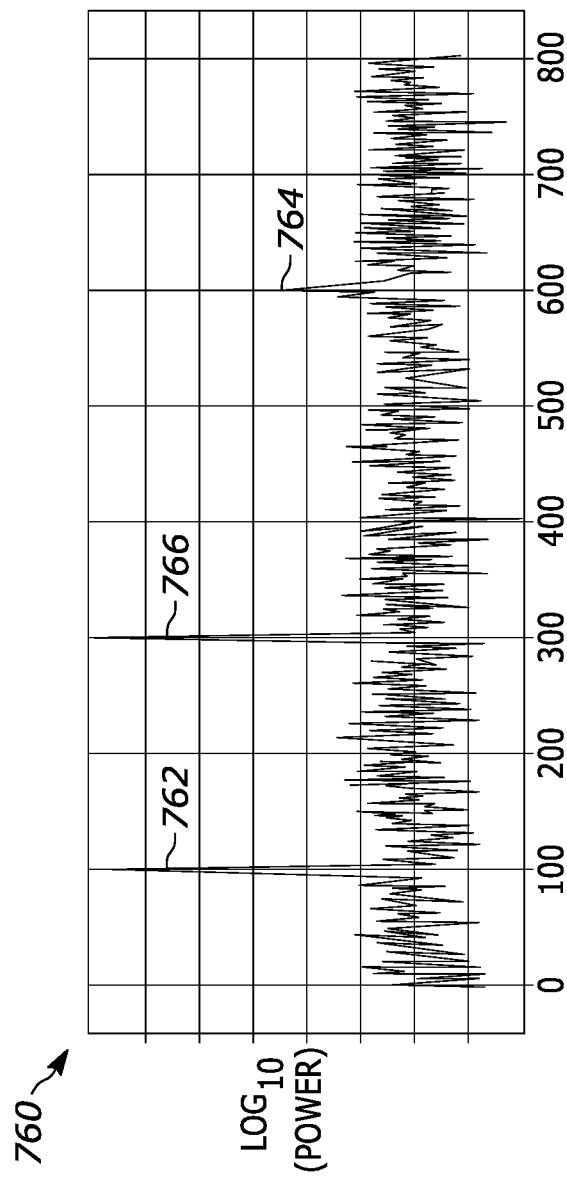
FIG. 7D illustrates a return pulse trace for another single laser shot of the same particular scene of the embodiment of the LIDAR system described in connection with FIG. 7A.

FIGS. 7A-7D illustrate four return pulse traces from the same measurement point within the FOV. More specifically, FIG. 7A illustrates a return pulse trace 700 for a single laser shot of a particular scene of an embodiment of a LIDAR system of the present teaching. FIG. 7B illustrates a return pulse trace 720 for another single laser shot of the same particular scene of the embodiment of the LIDAR system. FIG. 7C illustrates a return pulse trace 740 for another single laser shot of the same particular scene of the embodiment of the LIDAR system. FIG. 7D illustrates a return pulse trace 760 for another single laser shot of the same particular scene of the embodiment of the LIDAR system. Each of these return pulse traces 700, 720, 740, 760 are the result from a single laser pulse interacting with the same target in a short enough time so that the target has not significantly moved. For example, these single laser pulses are typically generated in rapid succession during LIDAR measurements.

In all four return pulse traces 700, 720, 740, 760, the random noise can be seen to vary causing each measurement to look slightly different. Two objects, one at 100 nanoseconds, and the second at 600 nanoseconds can be seen in all four measurements. In return pulse trace 700, these objects cause peak 702 and peak 704. In return pulse trace 720, these objects cause peak 722 and peak 724. In return pulse trace 740, these objects cause peak 742 and peak 744. In return pulse trace 760, these objects cause peak 762 and peak 764. However, in return pulse trace 760 of FIG. 7D, a strong signal 766 occurs at 300 nanoseconds.

The LIDAR system can adaptively react to the presence of this possible false object by processing these traces in various ways. For example, the system could fire another laser pulse to confirm this last measurement, return pulse trace 760, and then, after a comparison, throw out the erroneous data. That is, this return pulse trace 760 would not be provided to a user in this situation, or reported to the next stage of the system processing. In an alternative method, the system could provide the data set to a user, but set a flag indicating that the data may be errant. In another alternative method, the system could provide the data and object detection result to a user, but flag that this detected object would be indicated as having a low probability. In some methods, this probability can be quantified based on the number of shots in a set of shots in which the object associated with the peak occurred. In this example, the peak was only detected in one fourth of the fired laser pulses.

Some embodiments of the pulsed TOF LIDAR system of the present teaching uses collimated transmitter laser beams with optical power/energy at or slightly below the MPE limit for Class 1 eye safety to provide a significant range increase compared to a conventional Flash LIDAR system. In addition, some embodiments of the pulsed TOF LIDAR systems of the present teaching use pulse averaging and/or pulse histogramming of multiple laser pulses to improve Signal-to-Noise Ratio (SNR), which further improves range. These LIDAR systems employ a very high single pulse frame rate, well above 100 Hz. See, for example, U.S. patent application Ser. No. 16/895,588, filed Jun. 8, 2020, entitled "Eye-Safe Long-Range Solid-State LIDAR System". U.S. patent application Ser. No. 16/895,588 is assigned to the present assignee and is incorporated herein by reference.

EQUIVALENTS

While the Applicant's teaching is described in conjunction with various embodiments, it is not intended that the Applicant's teaching be limited to such embodiments. On the contrary, the Applicant's teaching encompasses various alternatives, modifications, and equivalents, as will be appreciated by those of skill in the art, which may be made therein without departing from the spirit and scope of the teaching.

What is claimed is:

1. A method of Light Detection and Ranging (LIDAR), the method comprising:
 a) generating a first optical pulse that propagates towards a target;
 b) receiving an optical return signal reflected from the target resulting from the generated first optical pulse;
 c) generating a return signal trace based on the received optical return signal;
 d) processing the optical return signal to determine a number of peaks detected in the return signal trace;
 e) determining that a maximum number of additional optical pulses is desired to be propagated towards the target if the number of peaks detected in the return signal trace is zero;

f) determining a first time-of-flight (TOF) to a peak in the return signal trace if the number of peaks detected in the return signal trace is one and then determining the number of additional optical pulses desired to be propagated towards the target is less than the maximum number if the determined first TOF to the peak if the number of peaks in the return signal trace is less than a first predetermined value;

g) determining a second TOF to a closest object if the number of peaks detected when the number of pulses in the return signal trace is two and then determining the number of additional optical pulses desired is less than the maximum number if the second TOF is less than a second predetermined value, wherein the number of additional optical pulses desired that is less than the maximum number if the second TOF is less than the second predetermined value is greater than the number of additional optical pulses desired that is less than the maximum number if the first TOF is less than the first predetermined value;

h) generating the determined number of additional optical pulses desired and propagating the generated additional optical pulses towards the target;

i) receiving additional optical return signals reflected from the target resulting from the generated additional optical pulses; and j) processing the received additional optical return signals to obtain one or more LIDAR measurements.

2. The method of claim 1 wherein the processing the optical return signal comprises determining a noise level of the optical return signal.

3. The method of claim 1 wherein the processing the optical return signal comprises performing steps in a decision tree.

4. The method of claim 3 wherein the decision tree is a static decision tree.

5. The method of claim 3 wherein the decision tree is a dynamic decision tree.

6. The method of claim 3 wherein the decision tree comprises a decision node that determines a number of peaks.

7. The method of claim 3 wherein the decision tree comprises a decision node that determines an ambient light level.

8. The method of claim 1 wherein the processing the optical return signal comprises performing a time-of-flight analysis.

9. The method of claim 1 wherein the processing the received additional optical return signals comprises performing receive signal filtering.

10. The method of claim 1 wherein the processing the received additional optical return signals comprises performing averaging.

11. The method of claim 1 wherein the processing the received additional optical return signals comprises performing histogramming.

12. The method of claim 1 further comprising generating three-dimensional measurement point data from the processed received additional optical return signals.

13. The method of claim 1 further comprising determining a number of return peaks from the processed received additional optical return signals.

14. The method of claim 1 further comprising determining time-of-flight data from the processed received additional optical return signals.

15. The method of claim 1 further comprising determining amplitudes of return peaks from the processed received additional optical return signals.

16. The method of claim 1 further comprising determining measurement errors from the processed received additional optical return signals.

17. The method of claim 1 wherein processing the optical return signal comprises adaptively processing.

18. The method of claim 1 wherein the steps are repeated at regular intervals a predetermined number of times to obtain a plurality of LIDAR measurements.

19. The method of claim 18 wherein the steps are repeated at regular intervals.

* * * * *